US012663950B2

(12) United States Patent
Park

(10) Patent No.: US 12,663,950 B2
(45) Date of Patent: Jun. 23, 2026

(54) DISPLAY DEVICE CONNECTED TO INPUT DEVICE, AND CONTROL METHOD THEREFOR

(71) Applicant: SAMSUNG ELECTRONICS CO., LTD., Suwon-si (KR)

(72) Inventor: Chansub Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/227,766

(22) Filed: Jun. 4, 2025

(65) Prior Publication Data

US 2025/0298566 A1 Sep. 25, 2025

Related U.S. Application Data

(63) Continuation of application No. PCT/KR2023/017472, filed on Nov. 3, 2023.

(30) Foreign Application Priority Data

Dec. 30, 2022 (KR) ........................ 10-2022-0190828

(51) Int. Cl.
*G06F 3/14* (2006.01)
*G06F 3/0481* (2022.01)
(Continued)

(52) U.S. Cl.
CPC .............. *G06F 3/14* (2013.01); *G06F 3/0481* (2013.01); *G06F 3/0484* (2013.01); *G06F 3/165* (2013.01)

(58) Field of Classification Search
None
See application file for complete search history.

(56) References Cited

U.S. PATENT DOCUMENTS 8,473,654 B2 6/2013 Dickens et al.
8,836,864 B2 9/2014 Choi et al.
(Continued)

FOREIGN PATENT DOCUMENTS

KR 10-2010-0107136 A 10/2010
KR 10-1135901 B1 4/2012
(Continued)

OTHER PUBLICATIONS

International Search Report (PCT/ISA/210) dated Feb. 21, 2024 issued by the International Searching Authority in International Application No. PCT/KR2023/017472.
Written Opinion (PCT/ISA/237) dated Feb. 21, 2024 issued by the International Searching Authority in International Application No. PCT/KR2023/017472.

*Primary Examiner* — Nicholas J Lee
(74) *Attorney, Agent, or Firm* — Sughrue Mion, PLLC

(57) ABSTRACT

A display device includes a first interface connected to an input device; a second interface connected to a source device; a display; at least one processor; and memory storing instructions, that, when executed by the at least one processor, cause the display device to control the display to display a first image in a first region of the display, and display a second image in a second region of the display, wherein the second image is received from the source device via the second interface; determine a priority for processing a control command associated with an indicator corresponding to the input device based on a position of the indicator on the display, and identify a device, from among the display device and the source device, to process the control command based on the priority.

20 Claims, 16 Drawing Sheets

(51) Int. Cl.
    *G06F 3/0484*    (2022.01)
    *G06F 3/16*      (2006.01)

(56)          References Cited

U.S. PATENT DOCUMENTS

| | | | |
|---|---|---|---|
| 9,749,575 B1 | 8/2017 | Lee et al. | |
| 2007/0126712 A1 | 6/2007 | Park et al. | |
| 2007/0273926 A1* | 11/2007 | Sugiyama | H04N 7/163 |
| | | | 358/1.18 |
| 2011/0234486 A1 | 9/2011 | Fujita | |
| 2015/0109344 A1* | 4/2015 | Tomono | G06T 1/20 |
| | | | 345/661 |
| 2016/0196051 A1 | 7/2016 | Han et al. | |
| 2017/0103731 A1 | 4/2017 | Hsieh | |

FOREIGN PATENT DOCUMENTS

| | | | | |
|---|---|---|---|---|
| KR | 10-2012-0073798 A | 7/2012 | | |
| KR | 10-2013-0084792 A | 7/2013 | | |
| KR | 10-2016-0083723 A | 7/2016 | | |
| KR | 10-1727317 B1 | 4/2017 | | |
| KR | 10-2017-0086244 A | 7/2017 | | |
| KR | 10-2017-0095679 A | 8/2017 | | |
| KR | 10-1841174 B1 | 5/2018 | | |
| KR | 10-1941591 B1 | 1/2019 | | |
| KR | 10-2254873 B1 | 5/2021 | | |
| WO | WO-2017126774 A1 * | 7/2017 | | H04N 21/422 |

* cited by examiner

DISPLAY DEVICE CONNECTED TO INPUT DEVICE, AND CONTROL METHOD THEREFOR

CROSS-REFERENCE TO RELATED APPLICATION

This application is a by-pass continuation application of International Application No. PCT/KR2023/017472, filed on Nov. 3, 2023, which is based on and claims priority to Korean Patent Application No. 10-2022-0190828, filed on Dec. 30, 2022, in the Korean Intellectual Property Office, the disclosures of which are incorporated by reference herein in their entireties.

BACKGROUND

1. Field

The present disclosure relates to a display device and a control method therefor, and more particularly, to a display device for identifying a device from among the display device or a source device connected to the display device, and that may process a control command from an input device connected to the display device, and a control method therefor.

2. Description of Related Art

In accordance with a recent development of electronic technology, a display device has been able to perform various functions beyond its function of only displaying an image acquired or generated by a source device (e.g., personal computer (PC) or set-top box) connected to the display device. In detail, the display device has been able to actively perform its communication with an external device (e.g., a server) via a communication interface, and utilize various applications, programs, or the like through/via a network. The display device may perform user voice recognition, and transmit a control command to an internet of things (IoT)-based electronic device connected to the network based on the user voice recognition. As an example, a smart monitor may correspond to the display device.

The display device may simultaneously display, on a display, an image acquired by the display device and an image received from the external source device connected to the display device. Here, the display device may receive the control command for controlling the display device or the external source device providing the image displayed on the display from an input device (e.g., mouse, keyboard, or remote control) connected to the display device.

SUMMARY

According to an aspect of the disclosure, a display device includes a first interface connected to an input device; a second interface connected to a source device; a display; at least one processor; and memory storing instructions, wherein the instructions, when executed by the at least one processor, cause the display device to control the display to display a first image of the display device in a first region of the display, and display a second image in a second region of the display, wherein the second image is received from the source device via the second interface; determine a priority for processing a control command associated with an indicator corresponding to the input device based on a position of the indicator on the display, and identify a device from among the display device and the source device to process the control command based on the priority, based on the first image being displayed in the first region and the second image being displayed in the second region, acquire first state information from the display device and second state information from the source device, and identify whether a priority change condition has occurred based on the first state information and the second state information, and based on identifying the priority change condition has occurred, re-identify the device to process the control command by changing the priority.

The instructions, when executed by the at least one processor, may cause the display device to identify the display device as the device to process the control command, and process the control command based on identifying the position of the indicator corresponds to the first region, and identify the source device as the device to process the control command, and transmit the control command to the source device, via the second interface, based on identifying the position of the indicator corresponds to the second region.

The instructions, when executed by the at least one processor, may cause the display device to identify, based on the position of the indicator corresponding to the second region, a type of content output to the second region, based on the second state information; identify that the priority change condition has occurred based on identifying the type of content as a first type; and re-identify the display device as the device to process the control command by changing the priority.

The instructions, when executed by the at least one processor, may cause the display device to identify, based on the position of the indicator corresponding to the second region, a type of content output to the first region, based on the first state information, identify, based on the type of content being a second type, that the priority change condition has occurred, and change the priority, wherein the second type may include a controllable pop-up user interface (UI); and re-identify the display device as the device to process the control command.

The instructions, when executed by the at least one processor, may cause the display device to, based on a first pop-up UI being displayed in the first region and the control command causing the first pop-up UI to disappear, return the position of the indicator to a prior position of the indicator in the second region from before the first pop-up UI was displayed.

The first interface may be connected to a first input device, the display device may further include a third interface connected to second input device, and the instructions, when executed by the at least one processor, may cause the display device to associate a first indicator with the first input device, and associate a second indicator with the second input device; and based on a first controllable pop-up UI being displayed in the first region, a first position of the first indicator corresponding to the second region, and a second position of the second indicator corresponding to the second region, identify the display device to process a first control command associated with the first indicator, and the source device process a second control command associated with the second indicator.

The display device may further include a speaker configured to output audio from the source device. The instructions, when executed by the at least one processor, may cause the display device to control the display to display a UI for adjusting a volume of the audio in a third region of the display based on the position of the indicator corresponding to the third region, and the third region may be within the first region and may be adjacent to the second region.

The second interface may be connected to a first source device, the display device may further include a third interface connected to a second source device, and the instructions, when executed by the at least one processor, may cause the display device to control the display to display, in a third region, a third image received from the second source device; identify the device to process the control command from among the display device, the first source device, and the second source device based on the priority.

According to an aspect of the disclosure, a control method of a display device including a first interface and a second interface, includes displaying a first image of the display device in a first region of a display of the display device, and displaying a second image in a second region of the display, wherein the second image is received from a source device connected to the display device via the second interface of the display device; determining a priority for processing a control command associated with an indicator corresponding to an input device connected to the display device via the first interface based on a position of the indicator on the display; and identifying a device from among the display device and the source device to process the control command based on the priority; based on the first image of the display device being displayed in the first region and the second image being displayed in the second region, acquiring first state information from the display device and second state information from the source device, and identifying whether a priority change condition has occurred based on the first state information and the second state information; and based on identifying the priority change condition has occurred, re-identifying the device to process the control command by changing the priority.

The identifying the device to process the control command may include identifying the display device as the device to process the control command, and processing the control command based on identifying the position of the indicator corresponds to the first region; and identifying the source device as the device to process the control command, and transmitting the control command to the source device, via the second interface, based on identifying the position of the indicator corresponds to the second region.

The re-identifying the device to process the control command may include identifying, based on the position of the indicator corresponding to the second region, a type of content output to the second region, based on the second state information; identifying the priority change condition has occurred based on identifying the type of content as a first type; and re-identifying the device to process the control command by changing the priority.

The re-identifying the device to process the control command may include identifying, based on the position of the indicator corresponding to the second region, a type of content output to the first region, based on the first state information; identifying, based on the type of content being a second type, that the priority change condition has occurred, and change the priority, wherein the second type may include a controllable pop-up user interface (UI); and re-identifying the display device as the device to process the control command.

The control method may further include, based on a first pop-up UI being displayed in the first region and the control command causing the first pop-up UI to disappear, returning the position of the indicator to a prior position of the indicator in the second region from before the first pop-up UI was displayed.

A first input device may be connected to the display device via the first interface, and a second input device may be connected to the display device via a third interface of the display device. The control method may further include associating a first indicator with the first input device, and associating a second indicator with the second input device. The re-identifying the device to process the control command may include, based on a first controllable pop-up UI being displayed in the first region, a first position of the first indicator corresponding to the second region, and a second position of the second indicator corresponding to the second region, processing, with the display device, a first control command associated with the first indicator, and processing, with the source device, a second control command associated with the second indicator.

According to an aspect of the disclosure, a non-transitory computer-readable recording medium having instructions recorded thereon, that, when executed by one or more processors, cause the one or more processors to display a first image of the display device in a first region of a display of a display device, and display a second image in a second region of the display, wherein the second image is received from a source device connected to the display device via a second interface of the display device; determining a priority for processing a control command associated with an indicator corresponding to an input device connected to the display device via a first interface of the display device based on a position of the indicator on the display; identify a device from among the display device and the source device to process the control command based on the priority; based on the first image of the display device being displayed in the first region and the second image being displayed in the second region, acquire first state information from the display device and second state information from the source device, and identify whether a priority change condition has occurred based on the first state information and the second state information; and based on identifying the priority change condition has occurred, re-identify the device to process the control command by changing the priority.

BRIEF DESCRIPTION OF THE DRAWINGS

The above and other aspects, features, and advantages of certain embodiments are more apparent from the following description taken in conjunction with the accompanying drawings, in which.

DETAILED DESCRIPTION

Figure 1:
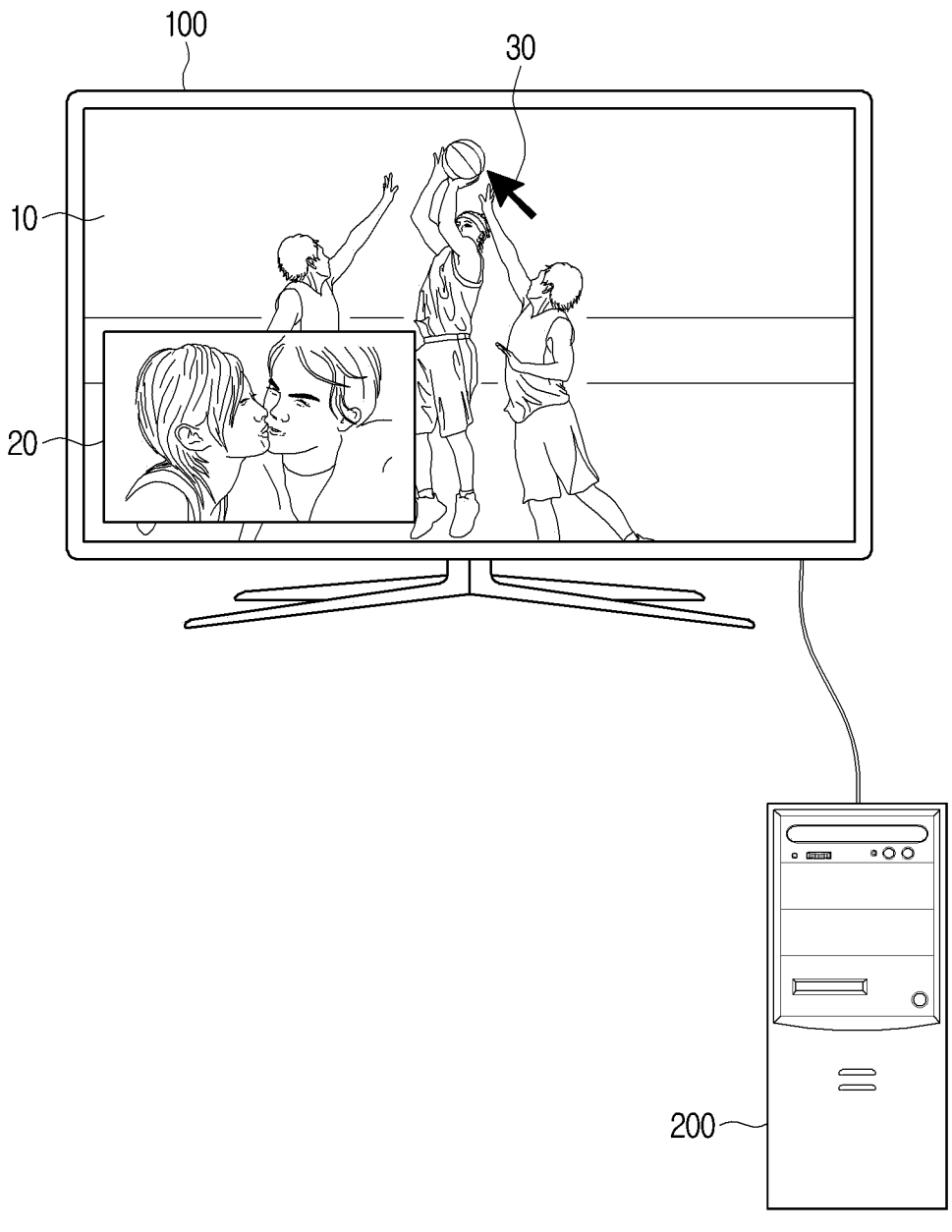
FIG. 1 is an example diagram of a display device according to an embodiment of the present disclosure.

The embodiments described in the disclosure, and the configurations shown in the drawings, are only examples of embodiments, and various modifications may be made without departing from the scope and spirit of the disclosure.

Throughout the accompanying drawings, similar components are denoted by similar reference numerals.

The following embodiments may be modified in several different forms, and the scope and spirit are not limited to the following embodiments. Rather, these embodiments are provided to convey the spirit of the disclosure to those skilled in the art.

Terms used in the present disclosure are used to describe the embodiments rather than limit the scope of the present disclosure. A term of a singular number may include its plural number unless explicitly indicated otherwise in the context.

In the present disclosure, the expression "have", "may have", "include", "may include" or the like, indicates the presence of a corresponding feature (for example, a numerical value, a function, an operation, or a component such as a part), and does not exclude the presence of an additional feature.

In the present disclosure, the expression "A or B", "least one of A and/or B" or "one or more of A and/or B" or the like, may include all possible combinations of items enumerated together. For example, "A or B", "at least one of A and B", or "at least one of A or B" may indicate all of 1) a case in which at least one A is included, 2) a case in which at least one B is included, or 3) a case in which both of at least one A and at least one B are included.

The expressions "first", "second", and the like, used in the disclosure may indicate various components regardless of the sequence and/or importance of the components. These expressions are only used to distinguish one component and another component from each other, and do not limit the corresponding components.

If any component (for example, a first component) is mentioned to be "(operatively or communicatively) coupled with/to" or "connected to" another component (for example, a second component), it should be understood that the any component is directly coupled to the another component or may be coupled to the another component through yet another component (for example, a third component).

If any component (for example, the first component) is mentioned to be "directly coupled with/to" or "directly connected to" another component (for example, the second component), it should be understood that yet another component (for example, the third component) is not present between any component and another component.

An expression "configured (or set) to" used in the present disclosure may be replaced by an expression "suitable for", "having the capacity to", "designed to", "adapted to", "made to", or "capable of", depending on the context. The expression "configured (or set) to" may not necessarily indicate "specifically designed to" in hardware.

Instead, an expression a device "configured to" in any context may indicate that the device may "perform~" together with another device or component. For example, a "processor configured (or set) to perform A, B, and C" may indicate a dedicated processor (for example, an embedded processor) that may perform the corresponding operations or a generic-purpose processor (for example, a central processing unit (CPU) or an application processor) that may perform the corresponding operations by executing one or more software programs stored in a memory device.

In the embodiments, a "module" or a "~er/or" may perform at least one function or operation, and be implemented by hardware or software or be implemented by a combination of hardware and software. A plurality of "modules" or a plurality of "~ers/ors" may be integrated into at least one module and implemented by at least one processor except for a "module" or an "~er/or" that is be implemented with hardware.

The various elements and regions in the drawings are schematically shown. Therefore, the spirit of the present disclosure is not limited by relative sizes or intervals shown in the accompanying drawings.

Hereinafter, the embodiments of the present disclosure are described in detail with reference to the accompanying drawings so that those skilled in the art to which the present disclosure pertains may practice the present disclosure.

FIG. 1 is an example diagram of a display device 100 according to an embodiment of the present disclosure.

Referring to FIG. 1, the display device 100 according to an embodiment may display an image generated or acquired by the display device 100 on a display 130 of the display device 100. The image acquired by the display device 100 may be an image acquired from an external device (e.g., an over the top (OTT service platform server) via a program, application, or the like, installed on the display device 100. The image generated by the display device 100 may be an image generated by the display device 100 on its own on the basis of a control command of a user via the program, the application, or the like installed in the display device 100. For convenience of description, the image directly generated or acquired by the display device 100 is referred to as a display device image 10.

The display device 100 may display an image received from an external source device 200 on the display 130 of the display device 100. Here, the image received from the external source device 200 may be an image acquired by the external source device 200 from another external device and then transmitted to the display device 100, an image pre-stored in the external source device 200, or an image generated by the external source device 200. For the convenience of description, the image received by the display from the external source device 200 is referred to as a source device image 20.

The display device 100 may display the display device image 10 and the source device image 20 on the display 130 simultaneously. Here, as shown in FIG. 1, the display device 100 may display the display device image 10 and then display the source device image 20 overlapping the displayed display device image 10. Alternatively, the display device 100 may display the display device image 10 and the source device image 20 in separate regions, respectively.

Here, the display device 100 may receive the control command (e.g., control command for adjusting a volume, changing a channel, or pausing or playing the image) for controlling either the display device image 10 or the source device image 20 via an input interface connected to the display device 100. Here, the display device 100 may identify a target of the control command and then process the control command based on the target of the control command. In detail, the display device 100 may perform an operation corresponding to the control command if the target of the control command is identified as the display device 100, and transmit the control command to the external source device 200 if the target of the control command is identified as the external source device 200.

An existing display device 100 may identify the target of the control command by using a separate control device such as a keyboard video and mouse (KVM) switch. In detail, the existing display device 100 may determine the target of the control command from an input device between the display device 100 and the source device 200 under control of the KVM switch. However, this method may make it difficult to quickly change the target of the control command because the user may manipulate the KBM switch or input a separate control command for the switch control.

The display device 100 according to an embodiment of the present disclosure may identify the target of the control command from the input device by referencing a position of an indicator 30 corresponding to an input device 300 on the display 130 of the display device 100, a state of the display device 100, and a state of the source device together. Therefore, the display device 100 in the present disclosure may accurately identify the target of the control command intended by the user without any intervention of the user (e.g., input of a separate control command for selecting the control command or manipulation of the input device).

Figure 2:
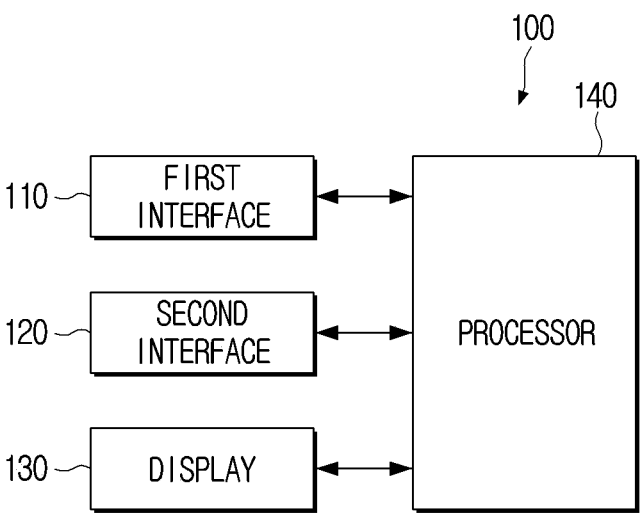
FIG. 2 is a block diagram of the display device according to an embodiment of the present disclosure.

FIG. 2 is a block diagram of the display device 100 according to an embodiment of the present disclosure.

The display device 100 according to an embodiment of the present disclosure may include a first interface 110, a second interface 120, the display, and a processor 140. According to an embodiment, the display device 100 may include another component in addition to the plurality of components shown in FIG. 2, and any one of the plurality of components shown in FIG. 2 may be replaced with another component. According to an embodiment, the display device 100 may be a smart television (TV) or a smart monitor.

The display device 100 may be connected to the input device 300 via the first interface 110. The first interface 110 may be implemented in any of various forms such as a high-definition multimedia interface (HDMI) port or a universal serial bus (USB) port. Here, the display device 100 may be connected to the input device 300 through a cable connected to the first interface 110. The first interface 110 may also be implemented as a communication interface using a short-range communication network. As an example, the first interface 110 may be a Bluetooth module, a ZigBee module, a near field communication (NFC) module, an infrared communication module, or the like. The input device 300 may be a device for inputting the control command into the display device 100 via the first interface 110 such as a mouse, a keyboard, or a remote controller.

The display device 100 may receive the control command from the input device 300 connected via the first interface 110. Here, the display device 100 may identify whether the received target of the control command is the display device 100 or another external device (e.g., source device 200) connected to the display device 100, and then process the control command.

The display device 100 may be connected to the source device 200 via the second interface 120. Here, the display device 100 may receive the source device image 20 from the source device 200 via the second interface 120. As an example, the display device 100 may display an image corresponding to the received image data on the display 130 of the display device 100 if the source device 200 receives the image data from the OTT service platform server and transmits the received image data to the display device 100 via the second interface 120. The source device 200 may be implemented as any of various electronic devices such as a mobile phone, a smartphone, a set-top box, a laptop PC, a desktop PC, a tablet PC, or a server.

Like the first interface 110, the second interface 120 may be implemented in any of various forms such as the HDMI port or the USB port. The second interface 120 may also be implemented as a communication interface using wireless communication. To this end, the second interface 120 may include various communication modules to perform its communication with the external device. As an example, a communication interface 150 may include a wireless communication module. The communication interface 150 may include, for example, a cellular communication module using at least one of long-term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM). As another example, the wireless communication module may include, for example, at least one of wireless fidelity (Wi-Fi), Bluetooth, Bluetooth low energy (BLE), or Zigbee.

The display 130 may display various information based on control of the processor 140. The display 130 may display at least one of the display device image 10 or the source device image 20. The display 130 may be implemented as a touchscreen with a touch panel. Here, the display 130 may function as an output device for outputting information between the display device 100 and the user, and simultaneously function as the input device for providing the input interface between the display device 100 and the user.

The display 130 may include various types of displays capable of displaying the image, such as a cathode ray tube (CRT), a liquid crystal display (LCD), a light emitting diode (LED), and a plasma display panel (PDP). The display 130 may further include an additional component based on its implementation method. For example, if the display is a liquid crystal display, the display 130 may include an LCD display panel, a backlight unit that supplies light thereto, and a panel driver board that drives a panel.

At least one processor 140 may control overall operations of the display device 100. In detail, at least one processor 140 may be electrically connected to various components in the display device 100, such as the first interface 110, the second interface 120, and the display, and control the overall operations of the display device 100. To this end, at least one processor 140 may include a random access memory (RAM), a read only memory (ROM, not shown), a central processing unit (CPU), a graphics processing unit (GPU, not shown), and a system bus, or the like, and execute operations or data processing related to control of at least one component included in the electronic device.

At least one processor 140 may control at least one component included in the electronic device by executing at least one instruction stored in storage, control at least one component through a hardware circuit or chip, or control at least one component through a combination of software and hardware.

At least one processor 140 may include at least one of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator.

At least one processor 140 may control one or any combination of other components of the electronic device and perform the operation related to the communication or data processing. At least one processor 140 may execute at least one program or instruction stored in the memory. For example, at least one processor 140 may perform a method according to an embodiment of the present disclosure by executing at least one instruction stored in the memory.

If the method according to an embodiment of the present disclosure includes a plurality of operations, the plurality of operations may be performed by one processor or by a plurality of processors. For example, a first operation, a second operation, and a third operation may be performed by the method according to an embodiment. The first operation, the second operation, and the third operation may all be performed by a first processor. The first operation and the second operation may be performed by the first processor (for example, a CPU), and the third operation may be performed by a second processor (for example, an artificial intelligence-only processor).

At least one processor 140 may be implemented as a single-core processor including a single core, or may be implemented as at least one multi-core processor including multi cores (for example, homogeneous multi cores or heterogeneous multi cores). If at least one processor is implemented as the multi-core processor, each of the multi cores included in the multi-core processor may include a processor internal memory such as a cache memory or an on-chip memory, and a common cache shared by the multi cores may be included in the multi-core processor. Each (or some) of the multi cores included in the multi-core processor may independently read and perform a program instruction for implementing the method according to an embodiment of the present disclosure, or all (or some) of the multi cores may be linked with each other to read and perform the program instruction for implementing the method according to an embodiment of the present disclosure.

If the method according to an embodiment of the present disclosure includes a plurality of operations, the plurality of operations may be performed by one core among the multi cores included in the multi-core processor, or may be performed by the multi cores. For example, the first operation, the second operation, and the third operation may be performed by the method according to an embodiment. The first operation, the second operation, and the third operation may all be performed by a first core included in the multi-core processor. Alternatively, the first operation and the second operation may be performed by the first core included in the multi-core processor, and the third operation may be performed by a second core included in the multi-core processor.

In the embodiments of the present disclosure, the processor 140 may indicate a system-on-chip (SoC) in which at least one processor and other electronic components are integrated with each other, the single-core processor, the multi-core processor, or the core included in the single-core processor or the multi-core processor. Here, the core may be implemented as the CPU, the GPU, the APU, the MIC, the DSP, the NPU, the hardware accelerator, the machine learning accelerator, or the like. However, the embodiments of the present disclosure are not limited thereto.

For the convenience of description, at least one processor 140 is referred to as the processor 140.

Figure 3:
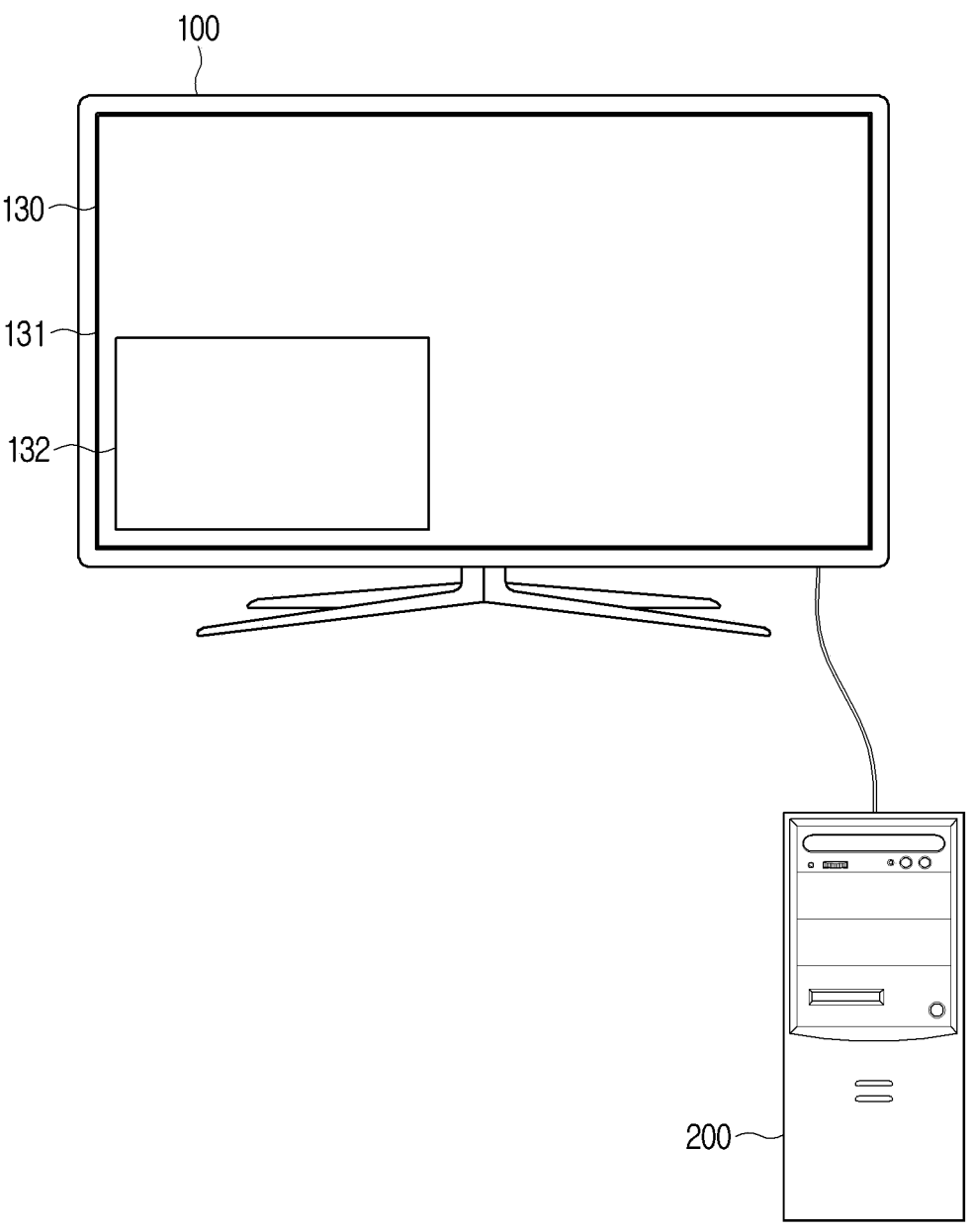
FIGS. 3 and 4 are example diagrams of a first region and a second region implemented on a display of the display device according to an embodiment of the present disclosure.
Figure 4:
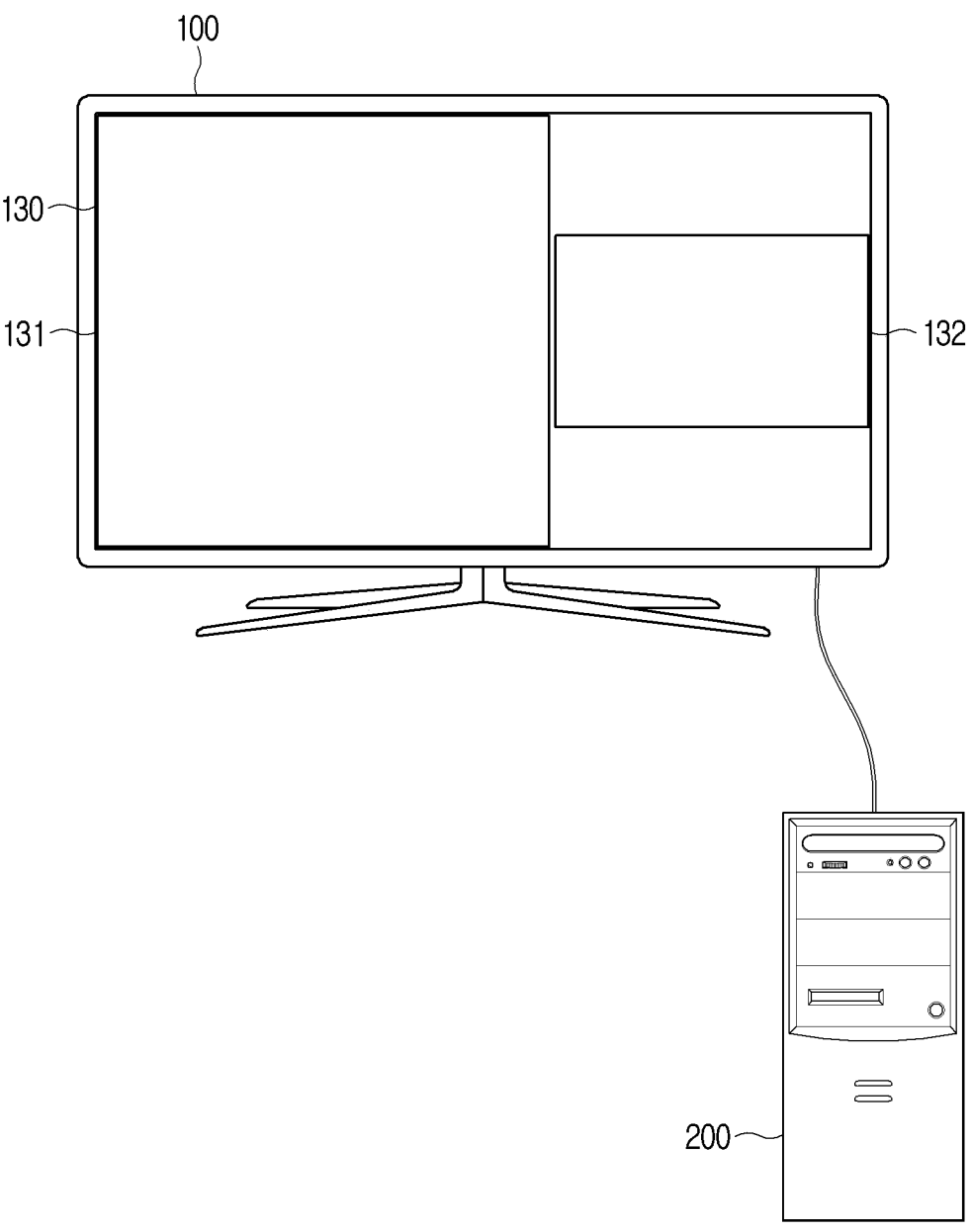

FIGS. 3 and 4 are example diagrams of a first region 131 and a second region 132 implemented on a display 130 of the display device 100 according to an embodiment of the present disclosure.

According to an embodiment of the present disclosure, the processor 140 may control the display to display the display device image 10 in the first region 131 of the display 130 and to display the image received from the source device 200 via the first interface 110 in the second region 132 of the display 130.

In detail, the processor 140 may display the received image on the display 130 if the image is received from the source device 200 via the second interface 120 while the display device image 10 is displayed on the display 130. Alternatively, the processor 140 may display the display device image 10 on the display 130 if the control command for displaying the display device image 10 is received from the input device 300 via the first interface 110 (or the input interface other than the first interface 110 that receives the control command from the user) while the source device image 20 is displayed on the display 130.

Here, the processor 140 may display the display device image 10 in the first region 131 of the display 130 and the source device image 20 in the second region 132 of the display 130. As shown in FIG. 3, the first region 131 may be set to an entire region of the display 130, and the second region 132 may be set to a predetermined size at a predetermined position in the first region 131. Alternatively, as shown in FIG. 4, the first region 131 and the second region 132 may be separately set on the display 130. That is, referring to FIG. 4, the first region 131 may be set to a left region of the display 130, and the second region 132 may be set to a right region of the display 130.

However, the present disclosure is not limited thereto, and the size and position of the first region 131 or the second region 132 set on the display 130 may be set in various ways. For example, the processor 140 may set the position and size of the first region 131 and the position and size of the second region 132 to enable a portion of the first region 131 to overlap a portion of the second region 132.

The processor 140 may set an additional region other than the first region and the second region 132 based on the number of images displayed on the display 130. Hereinafter, the display device image 10 and the source device image 20 may be described as being displayed on the basis of the first region 131 set as the entire region of the display 130 and the second region 132 disposed in the first region 131, as shown in FIG. 3.

The processor 140 may display the display device image 10 in the first region 131 of the display 130. Here, the display device image 10 may be an image acquired from another external device (e.g., over the top (OTT) service platform server) by the processor 140 executing an application or a program stored in the display device 100, as described with reference to FIG. 1.

The processor 140 displays the source device image 20 in the second region 132 of the display 130. Here, the source device image 20 may be the image acquired by the source device 200 from another external device and then transmitted to the display device 100, the image pre-stored in the source device 200, or the image generated by the source device 200, as described with reference to FIG. 1. The processor 140 may separately display the display device image 10 and the source device image 20.

The processor 140 may display the indicator corresponding to the input device in addition to the display device image 10 and the source device image 20. Here, the indicator may include a graphic user interface (UI), an icon, or the like corresponding to the input device. As an example, if the input device is the mouse, the processor 140 may display a cursor UI corresponding to the mouse on the display.

Here, according to an embodiment of the present disclosure, the processor 140 may determine a priority for processing the control command associated with the indicator on the basis of the position of the indicator 30 corresponding to the input device 300 on the display 130 of the display device 100.

Here, the priority may be an order of the targets of the control command between the display device 100 and the source device 200, input via the input device 300. In detail, the processor 140 may identify the device to process the control command input via the input device 300 based on the priority.

In particular, the processor 140 may determine the priority for processing the control command associated with the indicator 30 between the display device 100 and the source device 200 on the basis of the position of the indicator 30 corresponding to the input device 300 on the display 130.

In detail, the processor 140 may identify the position of the indicator 30 corresponding to the input device 300 on the display 130 of the display device 100. Here, the processor 140 may change the position of the indicator 30 corresponding to the input device 300 on the display 130 based on a movement of the input device 300. In addition, the processor 140 may identify the position of the indicator 30 and identify the priority for the target of the control command input via the input device 300 on the basis of the identified position of the indicator 30.

According to an embodiment of the present disclosure, the processor 140 may identify the display device 100 as a device to process the control command associated with the indicator 30 if the position of the indicator 30 is identified as being included in the first region 131. The processor may identify the target of the control command input via the input device 300 as the display device 100 as having a first priority and the source device 200 as having a second priority if the position of the indicator 30 is identified as being included in the first region 131.

The processor 140 may identify the source device 200 as the device to process the control command associated with the indicator 30 if the identified position of the indicator 30 is identified as being included in the second region 132. The processor may identify the target of the control command input via the input device 300 as the source device 200 as having the first priority and the display device 100 as having the second priority if the position of the indicator 30 is identified as being included in the second region 132.

In detail, the processor 140 may identify whether the position of the indicator 30 corresponding to the input device 300 is in the first region 131 where the display device image 10 is displayed or in the second region 132 where the source device image 20 is displayed. The processor 140 may identify the target of the control command from the input device as the display device 100 if the position of the indicator 30 corresponding to the input device 300 is identified as being in the first region 131 where the display device image 10 is displayed. The processor 140 may identify the target of the control command from the input device as the source device 200 if the position of the indicator 30 corresponding to the input device 300 is identified as being in the second region 132 where the source device image 20 is displayed.

Figure 5:
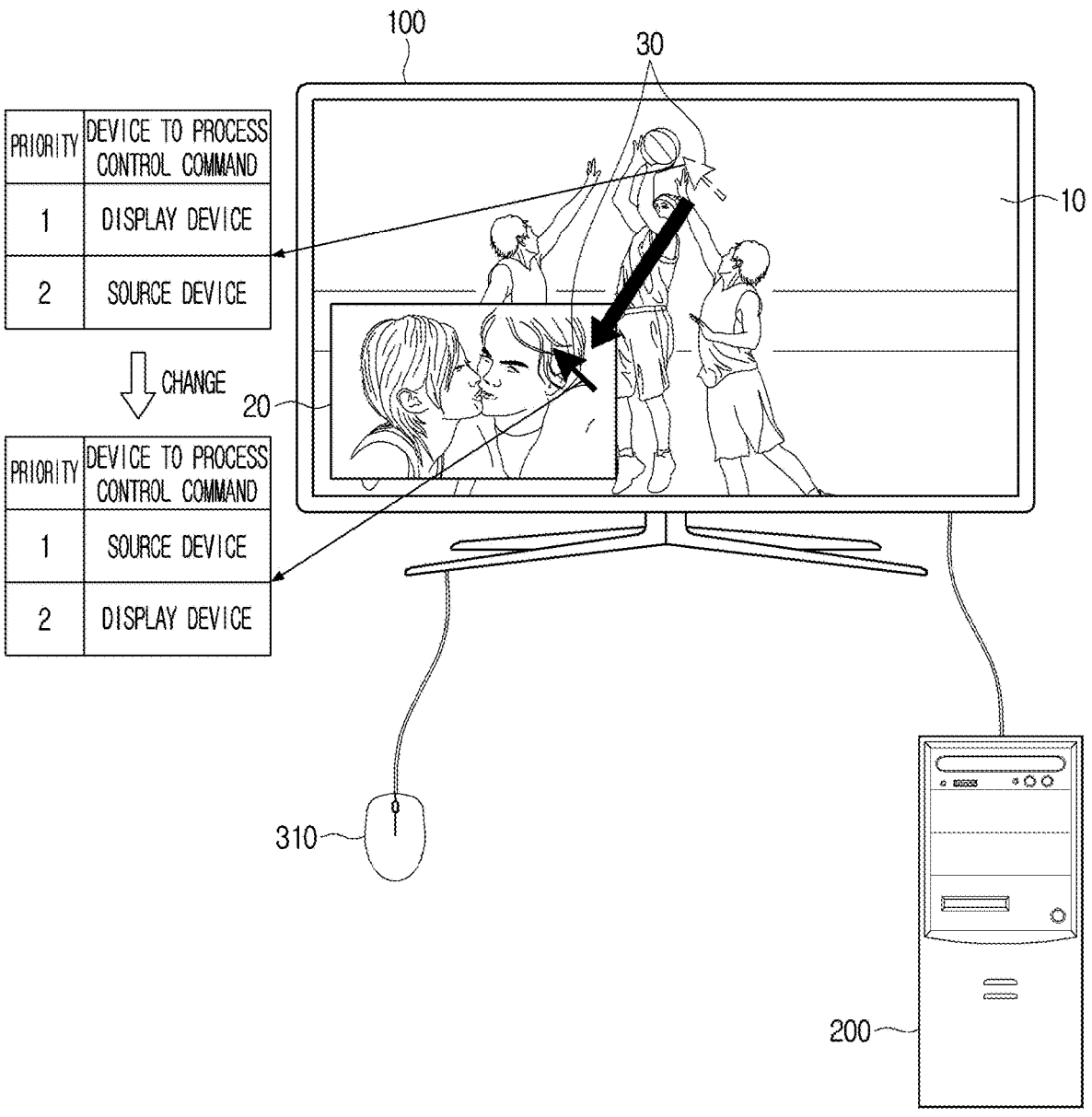
FIG. 5 is a diagram for describing a method for identifying a device to process a control command from an input device on the basis of a position of an indicator corresponding to the input device on the display according to an embodiment of the present disclosure.

FIG. 5 is a diagram for describing a method for identifying the device to process the control command from the input device on the basis of a position of the indicator 30 corresponding to the input device 300 on the display 130 according to an embodiment of the present disclosure.

Referring to FIG. 5, the processor 140 may identify the position of the indicator 30 corresponding to the input device 300 on the display 130. Here, the processor 140 may re-identify the priority if the indicator 30 is moved from the first region 131 to the second region 132 under control from the input device. The processor 140 may identify the target of the control command input via the first interface 110 as the source device 200 on the basis of the position of the indicator 30 moved to the second region 132. As an example, the processor 140 may identify an input such as a click or drag input via the input device 300, as an input for the source device image 20.

The processor 140 may process the control command associated with the indicator 30 on the basis of the identified device or transmit the control command associated with the indicator 30 to the source device 200 via the second interface 120.

In detail, the processor 140 may perform the operation corresponding to the control command if the target of the control command from the input device (in detail, the control command input via the first interface 110 by controlling the input device 300) is identified as the display device 100. As an example, the processor 140 may end output of the display image displayed in the first region 131 based on the input control command if the control command is input to end the output of the display device image 10 being displayed in the first region 131. Here, the control command may include various instructions input via the input device 300, and may include the various control commands based on a type of the input device 300.

As an example, if the input device 300 is a mouse 310, the control command from the input device may be a control command set corresponding to the click, number of clicks, drag, or the like of the mouse 310. Alternatively, if the input device 300 is a keyboard 320, the control command from the input device may be an instruction using a character, a symbol, or the like, or a control command set for a key (e.g., shortcut key to which the control command is set), input through a key included in the keyboard 320. In addition, if the input device 300 is the remote controller, the control command from the input device may be a control command set for each key disposed on the remote controller.

Hereinafter, the input device 300 may be described as the mouse 310. Accordingly, as shown in FIGS. 5 to 10, the indicator 30 corresponding to the input device 300 displayed on the display 130 is described as a graphic object (or icon) corresponding to the mouse 310.

The processor 140 may transmit the control command from the input device to the source device 200 via the second interface 120 if the target of the control command from the input device (in detail, the control command input via the first interface 110 by controlling the input device 300) is identified as the source device 200. As an example, the processor 140 may transmit the input control command to the source device 200 via the second interface 120 if the control command is input to change the source device image 20 being displayed in the second region 132. Accordingly, the source device 200 may change the source device image 20 output by the source device 200.

According to an embodiment, the processor 140 may identify the target of the control command on the basis of state information of each of the display device 100 and the source device 200, as well as the position of the indicator 30 on the display 130.

The processor 140 may acquire the state information of each of the display device 100 and the source device 200 and identify whether a priority change condition occurs on the basis of the acquired state information while the image of the display device 100 and the image received from the source device 200 are displayed in the first region and the second region. The processor 140 may re-identify the device to process the control command associated with the indicator by changing the priority if the priority change condition is identified as occurring. The processor may identify the device to process the control command associated with the indicator 30 on the basis of the state information of each of the display device 100 and the source device 200 even if the position of the indicator 30 corresponding to the input device 300 is not changed. The processor may identify whether the priority change condition occurs based on the position of the indicator 30, on the basis of the state information of each of the display device 100 and the source device 200, and re-identify the device to process the control command associated with the indicator 30 by adjusting the priority identified based on the position of the indicator 30 if the priority change condition is identified as occurring.

The processor 140 may identify the target of the control command from the input device as the source device 200 based on the state of the display device 100 or the state of the source device even if the indicator 30 corresponding to the input device 300 is disposed in the first region 131 of the display 130.

The processor 140 may identify the target of the control command from the input device as the display device 100 based on the state of the display device 100 or the state of the source device even if the indicator 30 corresponding to the input device 300 is disposed in the second region 132 of the display 130. An embodiment related thereto is described in detail.

The state information of the display device 100 may include a type of the display device image 10, whether an event occurs on the display device 100, or the like. The state information of the source device may include a type of the source device image 20, whether an event occurs on the source device 200, or the like.

Figure 6A:
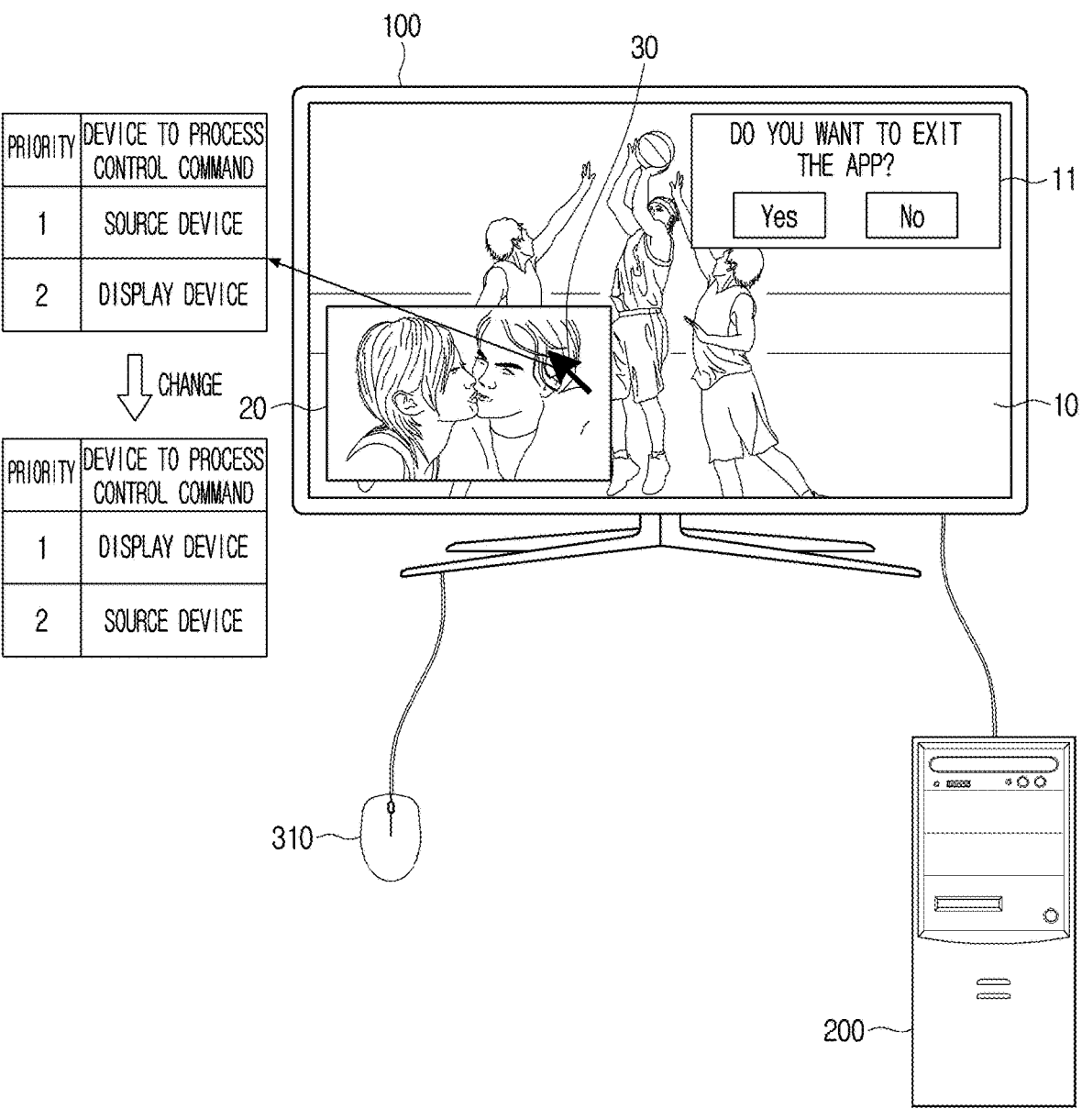
FIGS. 6A and 6B are diagrams for describing a method for identifying the device to process the control command from the input device based on a pop-up user interface (UI) displayed in a first region according to an embodiment of the present disclosure.
Figure 6B:
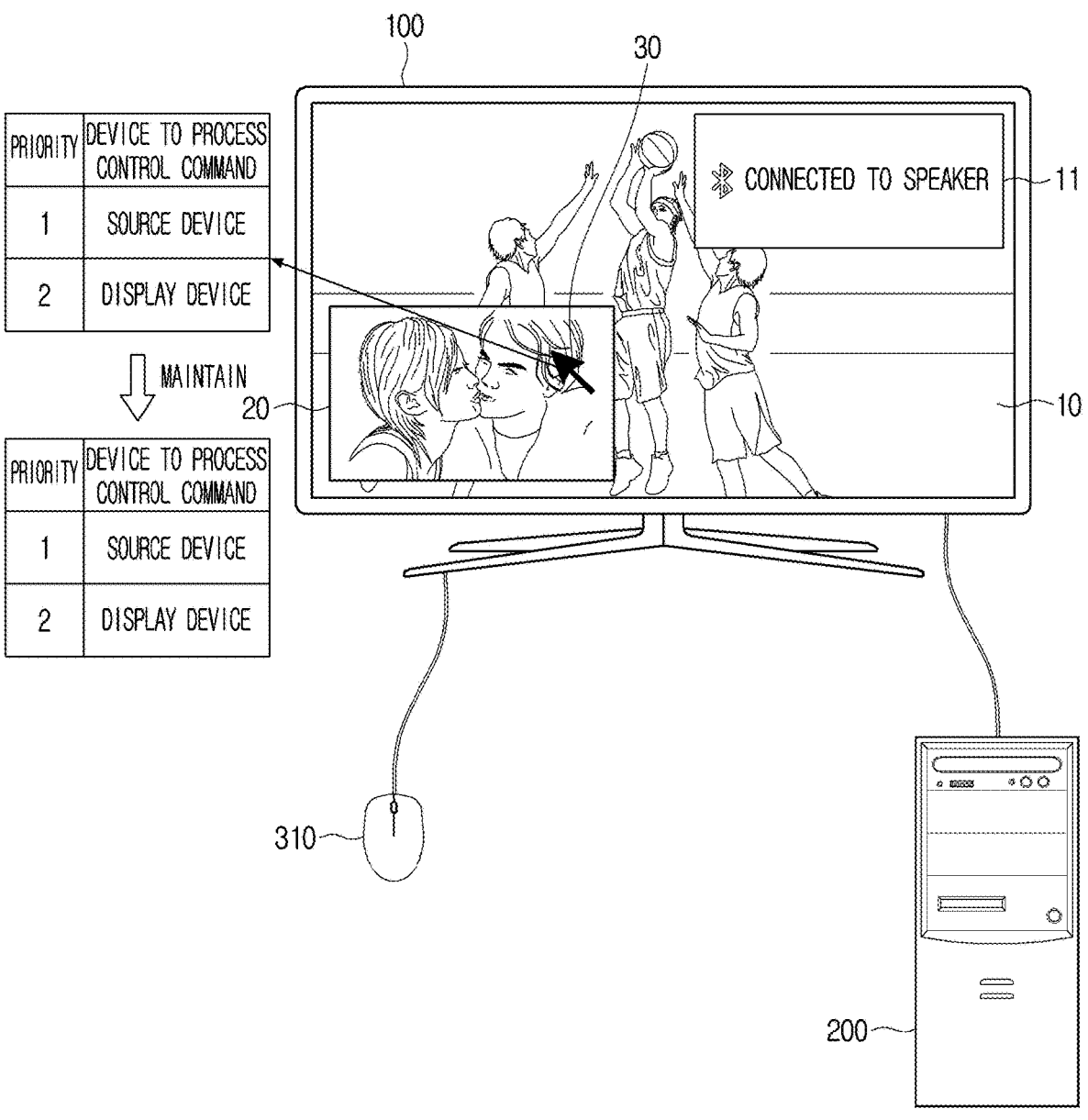

FIGS. 6A and 6B are diagrams for describing a method for identifying the device to process the control command from the input device based on a pop-up user interface (UI) displayed in the first region 131 according to an embodiment.

Figure 7A:
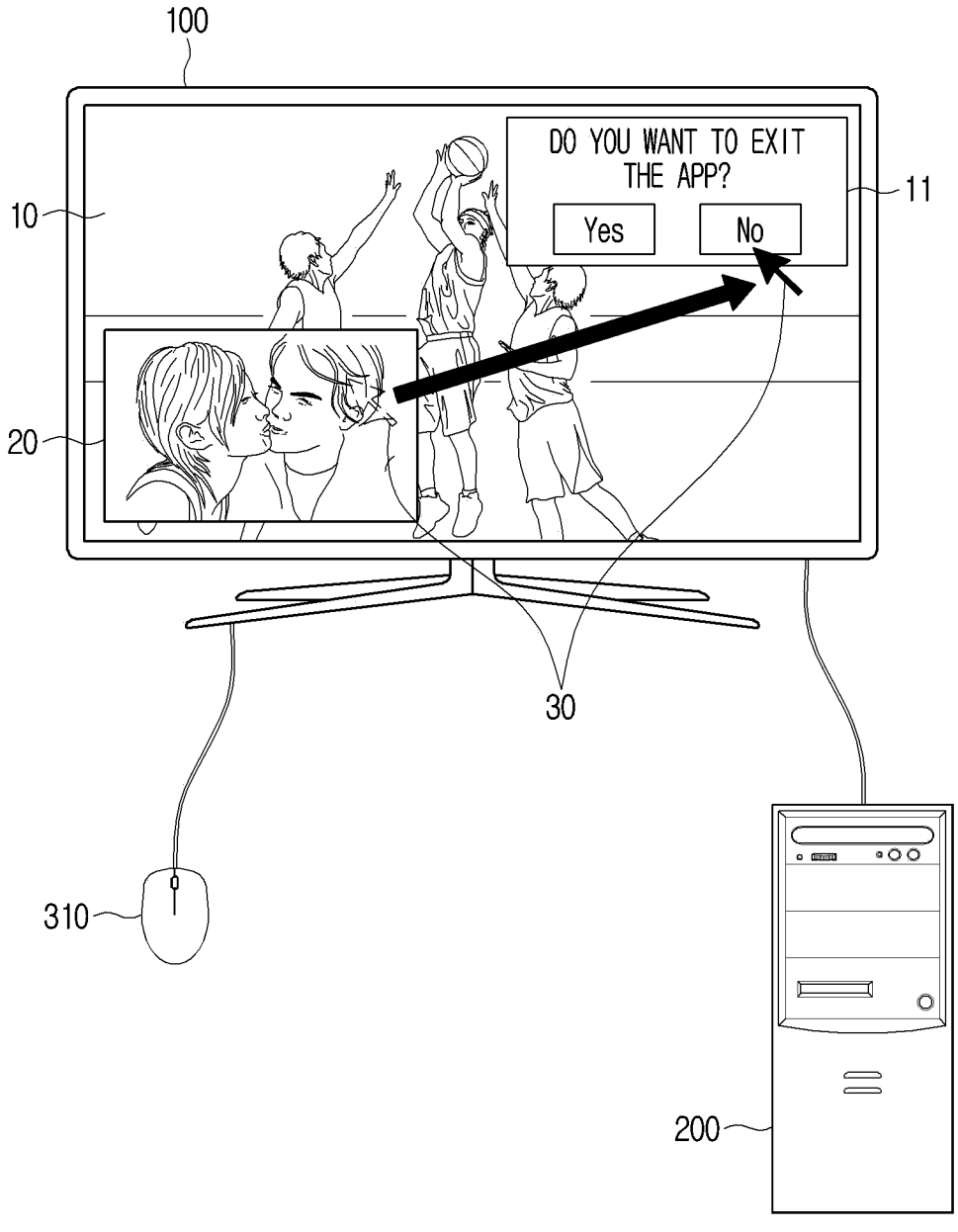
FIGS. 7A, 7B, and 7C are diagrams for describing a method for displaying the indicator corresponding to the input device after the pop-up UI displayed in the first region disappears.
Figure 7B:
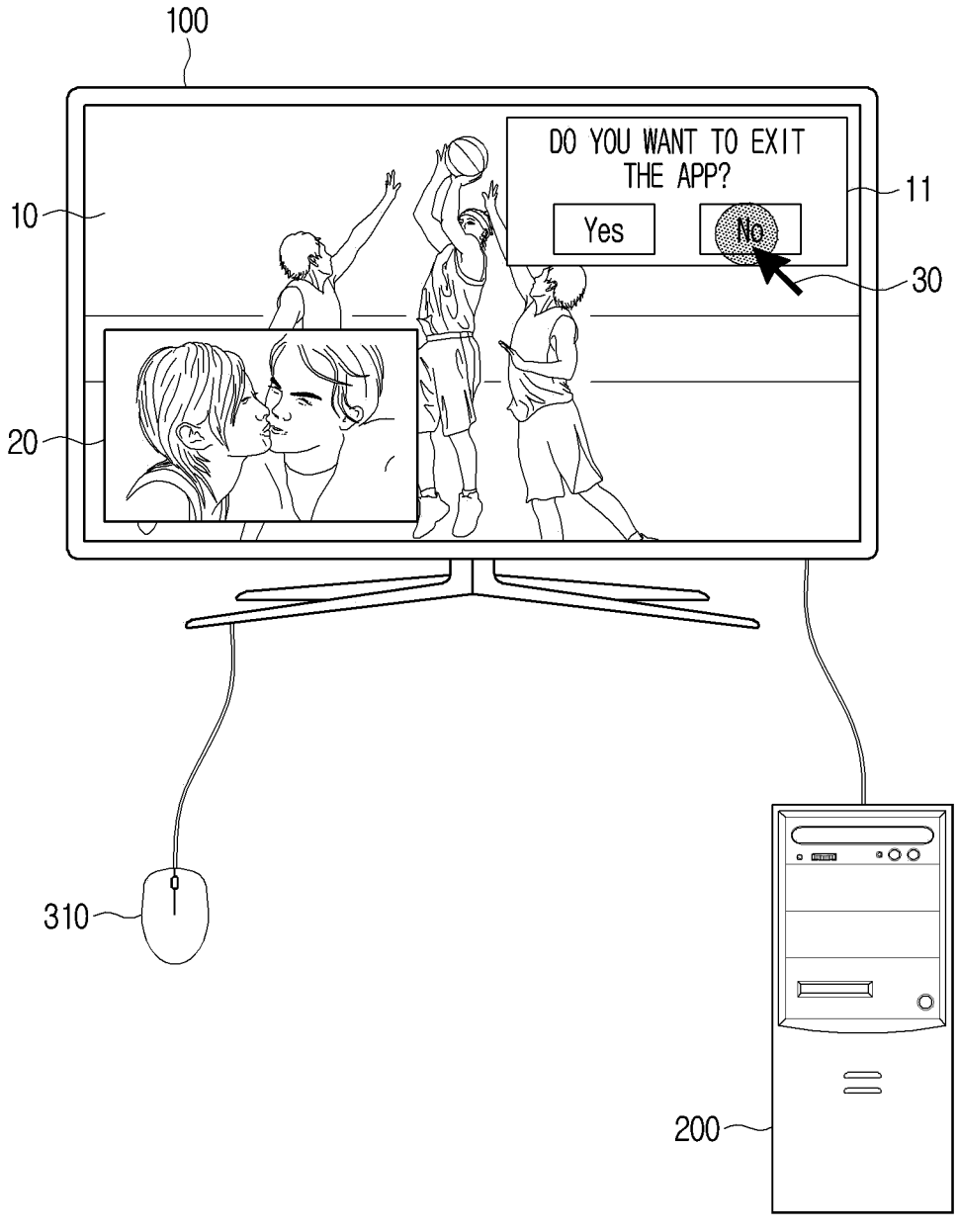
Figure 7C:
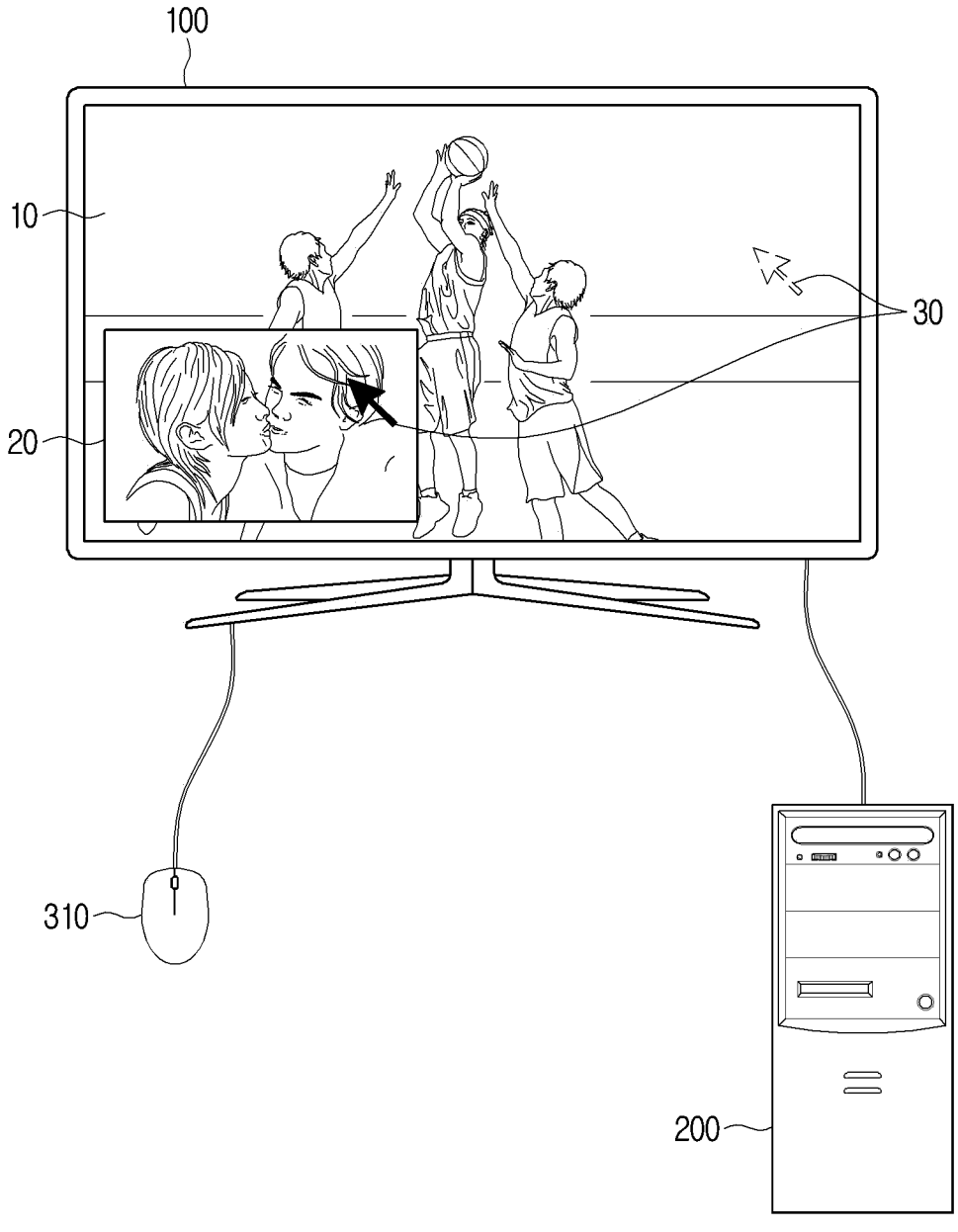

FIGS. 7A, 7B, and 7C are diagrams for describing a method for displaying the indicator 30 corresponding to the input device 300 after the pop-up UI displayed in the first region 131 disappears.

According to an embodiment, the processor 140 may identify a type of content provided to the second region 132 based on the state information of the source device 200 while the indicator 30 is included in the second region 132, and identify that the priority change condition occurs and may change the priority if the identified type of content is identified as a first type of content. The processor 140 may identify the display device 100 as the device to process the control command associated with the indicator 30 by changing the priority. The processor 140 may continuously receive the state information (for example, type of content displayed in the second region 132) of the source device 200 while the indicator 30 is included in the second region 132. The type of content may be a type of event that occurs on the source device 200.

The processor 140 may identify that the priority change condition occurs if it is identified that the content displayed in the second region 132 is the first type of content or is changed from another type of content to the first type of content on the basis of the state information received at that moment. The processor 140 may identify the priority change condition as occurring and may change the priority. The processor 140 may change the target of the control command from identifying the source device 200 as the first priority and the display device 100 as the second priority to identifying the display device 100 as the first priority and the source device 200 as the second priority.

Here, the processor 140 may identify the target of the control command from the input device as the display device 100 instead of the source device 200 on the basis of the state information of the source device even if the indicator 30 is disposed in the second region 132 where the source device image 20 is displayed.

The processor 140 may identify the type of content provided in the second region 132 on the basis of a type of the image 20 from the source device 200 displayed in the second region 132. In detail, the processor 140 may identify the type of the source device image 20 on the basis of metadata of the image received from the source device 200 via the second interface 120 for display in the second region 132. The processor 140 may extract the metadata included in an image data if the image data is received from the source device 200 via the second interface 120, and identify the type of the image 20 from the source device 200 to be displayed in the second region 132 on the basis of the extracted metadata. The processor 140 may identify the type of event that occurs on the source device 200, the type of content provided to the second region 132 on the basis of the identified type of the image 20 from the source device 200.

Alternatively, the processor 140 may receive information on an application or program that generates or transmits the image 20 from the source device 200 via the second interface 120. In addition, the processor 140 may identify the type of content provided to the second region 132 on the basis of the received information on the application or program.

Here, the processor 140 may identify the display device 100 as the device to process the control command from the input device if the type of content provided to the second region 132 is identified as a type of content (hereinafter, the first type) that may not use the control command from the input device.

As an example, the second region 132 of the display device 100 may display an image related to a program being executed if the source device 200 executes the program in which the input of the control command is interrupted for a predetermined time. Here, the processor 140 may acquire information on the program being executed on the source device 200 via the second interface 120, and identify that the type of content provided to the second region 132 (or the type of content generated by the source device 200 and displayed in the second region 132) corresponds to the type of content that may not use the control command (for example, first type) based on the acquired program information.

Here, the processor 140 may identify the target of the control command input via the input device 300 as the display device 100 instead of the source device 200 even if the indicator 30 of the input device is disposed in the second region 132. Accordingly, the processor 140 may perform the operation corresponding to the control command input via the input device 300.

The processor 140 may identify the target of the control command from the input device as the display device 100 instead of the input device 300 if the event is identified as occurring on the display device 100 while the indicator 30 is included in the second region 132.

In this regard, according to an embodiment, the processor 140 may identify the type of content provided to the first region 131 based on the state information of the display device 100 while the indicator 30 is included in the second region 132, and identify that the priority change condition occurs if the identified type of content is identified as a second type of content. The processor 140 may identify the display device 100 as the device to process the control command associated with the indicator 30 by changing the priority.

In detail, the processor 140 may identify the target of the control command from the input device as the display device 100 instead of the source device 200 on the basis of the state information of the display device 100 even if the indicator 30 is disposed in the second region 132 where the source device image 20 is displayed. In detail, the processor 140 may identify the type of content provided to the first region 131. The type of content provided to the first region 131 may be a type of event that occurs on the display device 100.

Alternatively, the processor 140 may identify the type of content provided to the first region 131 on the basis of a type of the display device image 10 displayed in the first region 131. To this end, the processor 140 may identify the type of content displayed in the first region 131. In detail, the processor 140 may also identify the type of content on the basis of metadata of the display device image 10 displayed in the first region 131. The processor 140 may extract the metadata of at least one image included in the display image displayed in the first region 131, and identify the type of the display device image 10 to be displayed in the first region 131 on the basis of the extracted metadata.

The processor 140 may identify the type of event that occurs on the display device 100, the type of content provided to the first region 131 on the basis of the identified type of the display device image 10. Alternatively, the processor 140 may identify the type of content provided to the first region 131 of the display device 100 that is displayed in the first region 131 on the basis of information from the application or program that is executed to display or acquire the display device image 10. Here, the type of content provided to the first region 131 may be the type of event that occurs on the display device 100.

Here, the processor 140 may identify the display device 100 as the device to process the control command from the input device if the type of content of the display device image 10 is identified as corresponding to a type of content (hereinafter, the second type) that is controllable via the input device 300.

In detail, referring to FIG. 6A, the processor 140 may identify the event occurring on the display device 100 while the indicator 30 is included in the second region 132. Here, the processor 140 may identify a type of generated pop-up UI 11 if an event that generates a pop-up window in the display device 100 is identified as occurring while the display device image 10 is displayed in the first region 131. The processor 140 may identify the type of Pop-up UI 11 on the basis of a type of application or program that generates the Pop-up UI 11, a source code of the Pop-up UI 11, or the like. Here, the processor 140 may identify that the priority change condition occurs if the type of generated pop-up window is identified as corresponding to the type of content (for example, second type) that is controllable via the input device 300. The processor 140 may change the priority and identify, as the display device 100, the target of the control command from the input device input through the indicator 30 disposed in the second region 132. Accordingly, even if the user inputs the control command by clicking the mouse 310, the processor 140 may perform the operation corresponding to the input control command rather than transmit the input control command to the source device 200 via the second interface 120.

The processor 140 may identify the target of the control command from the input device as the source device 200 if the pop-up UI 11 generated in the first region 131 is intended only to convey information while the indicator 30 is disposed in the second region 132 as shown in FIG. 6B, if the type of content does not correspond to the second type.

According to an embodiment, the processor 140 may identify the display device 100 as the device to process the control command associated with the indicator 30 if the content provided to the first region 131 is a controllable pop-up UI while the indicator 30 is included in the second region 132, and control the display to display the indicator 30 at the position of the indicator 30 in the second region 132 before the pop-up UI is displayed if the pop-up UI disappears from the first region 131.

The processor 140 may identify the target of the control command from the input device corresponding to the indicator 30 disposed in the second region 132 based on an event that occurs in the first region 131 by changing the target of the control command from the source device 200 to the display device 100, and identify the target of the control command from the input device corresponding to the indicator 30 as the source device 200 again if the event that occurs in the first region 131 ends. Accordingly, the processor 140 may display the indicator 30 in the second region 132 where the source device image 20, which is a previous target of the control command, is displayed.

In detail, the processor 140 may identify the target of the control command from the input device by changing the target of the control command from the source device 200 to the display device 100 if the type of content provided to the first region 131 is identified as corresponding to the second type while the indicator 30 is included in the second region 132. As an example, the processor 140 may identify that the type of content provided to the first region 131 corresponds to the second type if the pop-up UI 11 generated in the first region 131 is identified as controllable via the input device 300. The processor 140 may remove the pop-up UI from the first region 131 based on the control command received via the input device 300. As an example, referring to FIG. 7A, the processor 140 may move and display the indicator 30 corresponding to the mouse 310 on the pop-up UI 11 displayed in the first region 131 on the basis of a movement of the mouse 310 corresponding to the input device 300. Referring to FIG. 7B, the processor 140 may perform an operation corresponding to a click of the mouse 310 on the pop-up UI 11 displayed in the first region 131 on the basis of the click of the mouse 310. The processor 140 may close the pop-up UI 11 displayed in the first region 131. The processor 140 may display the indicator 30 moved to the first region 131 again in the second region 132. The processor 140 may display the indicator 30 in the second region 132, where the source device image 20 is displayed, the source device image 20 being the target of the control command from the input device before the event occurs in the first region 131. Here, the position of the indicator 30 displayed in the second region 132 may be the position of the indicator 30 at a time point at which the target of the control command from the input device is changed from the source device 200 to the display device 100 due to the occurrence of the event in the first region 131 and is identified. Referring to FIG. 7C, the processor 140 may display the indicator 30 corresponding to the mouse 310 in the second region 132 even without a separate control input via the mouse 310.

Figure 8:
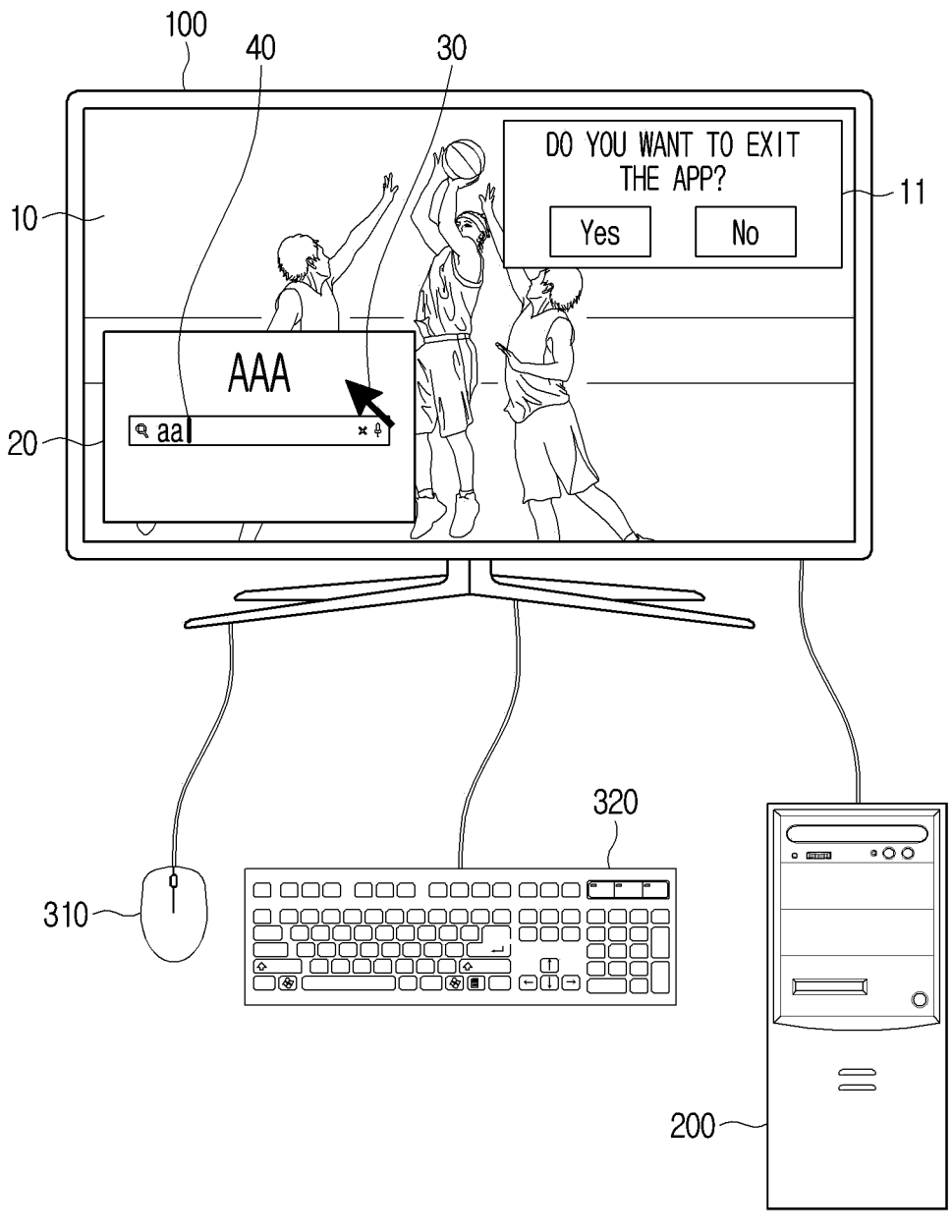
FIG. 8 is a diagram for describing a method for identifying the device to process the control command from the input device on the basis of the position of the indicator corresponding to each of the plurality of input devices according to an embodiment.

FIG. 8 is a diagram for describing a method for identifying the device to process the control command from the input device on the basis of the position of the indicator 30 corresponding to each of the plurality of input devices 300 according to an embodiment.

According to an embodiment, the display device 100 may be connected to the plurality of input devices 300. In detail, the display device 100 may be connected to another input device other than the input device 300 connected via the first interface 110 by using a third interface included in the display device 100.

The third interface may be implemented in any of various forms such as the HDMI port or the USB port. Here, the display device 100 may be connected to another input device through a cable connected to the third interface. The third interface may be implemented as the communication interface using a short-range communication network. As an example, the third interface may be the Bluetooth module, the ZigBee module, the near field communication (NFC) module, the infrared communication module, or the like. Another input device may be a device for inputting the control command to the display device 100 via the third interface, such as the mouse 310, the keyboard 320, or the remote controller.

According to an embodiment, the processor 140 may display the indicator 30 corresponding to the input device 300 and the indicator 30 corresponding to another input device on the display 130. Here, the processor 140 may identify the display device 100 as the device to process the control command associated with the indicator 30 corresponding to the input device 300 if the content provided to the first region 131 is the controllable pop-up UI while the indicator 30 corresponding to the input device 300 and the indicator 30 corresponding to another input device are included in the second region 132. The processor 140 may identify the source device 200 as the device to process the control command associated with the indicator 30 corresponding to another input device.

In detail, the processor 140 may identify that the priority change condition occurs if the targets of the control command from the plurality of input devices corresponds to the same source device 200, and the type of content provided to the first region 131 is identified as the second type. Here, the processor 140 may determine to change the priority for only one of the plurality of input devices 300, while maintaining the priority for the other input device 300.

The processor 140 may identify the target of the control command from each input device on the basis of types of the plurality of input devices. As an example, the processor 140 may identify whether the type of input device corresponds to a pointing device if an event corresponding to a type of content of the second type occurs in the first region 131 while the indicators 30 corresponding to each of the plurality of input devices 300 is disposed in the second region 132, and change the priority for the target of the control command if the input device corresponds to the pointing device. The processor 140 may identify the display device 100 as having the first priority and the source device 200 as having the second priority as the control targets by changing the priority for the target of the control command related to the pointing device. The processor 140 may identify the source device 200 as having the first priority and the display device 100 as having the second priority as the control targets by maintaining the priority for the target of the control command for the other input device that does not correspond to the pointing device.

Referring to FIG. 8, if the input device 300 connected to the first interface 110 of the display device 100 is the mouse 310, and the input device 300 connected to the third interface of the display device 100 is the keyboard 320, the processor 140 may display the indicator 30 corresponding to the mouse 310 and an indicator 40 corresponding to the keyboard 320 on the display 130. Here, if the indicator 30 corresponding to the mouse 310 and the indicator 40 corresponding to the keyboard 320 are disposed in the second region 132, the processor 140 may identify the source device 200 as having the first priority and the display device 100 as having the second priority in terms of the priorities for the targets of the control commands from the mouse 310 and the keyboard 320.

The processor 140 may identify a type of content of the event that occurs in the first region 131 if the event occurs in the first region 131 while the indicator 30 corresponding to the mouse 310 and the indicator 40 corresponding to the keyboard 320 are disposed in the second region 132. The processor 140 may identify that the priority change condition occurs if the event that occurs in the first region 131 indicates that the pop-up UI 11 is displayed, and the pop-up UI 11 corresponds to the type of content of the second type that is controllable.

Here, the processor 140 may change the priority for the target of the control command from the mouse 310, corresponding to the pointing device, which may be more moved from the second region 132 to the first region 131 among the plurality of input devices 300. The processor 140 may identify the display device 100 as having the first priority and the source device 200 as having the second priority in terms of the targets of the control commands from the mouse 310.

The processor 140 may not change the priority for the target of the control command for the keyboard 320, and may still identify the source device 200 as having the first priority and the display device 100 as having the second priority in terms of the targets of the control commands. Accordingly, the processor 140 may perform the operation corresponding to the control command for the control command input via the mouse 310 while the indicator 30 corresponding to the mouse 310 and the indicator 40 corresponding to the keyboard 320 are disposed in the second region 132, and transmit the control command for the control command input via the keyboard 320 to the source device 200 by using the second interface 120.

According to an embodiment, the processor 140 may identify the type of content of the event that occurs in the first region 131 first if the events occur simultaneously in the first region 131 and the second region 132 while the indicator 30 of the input device is disposed in the second region 132. Here, the processor 140 may identify the display device 100 as the device to process the control command from the input device if the type of content of the event that occurs in the first region 131 corresponds to the second type.

The processor 140 may identify a type of content of an event that occurs in the second region 132 if the type of content of the event that occurs in the first region 131 is identified as not corresponding to the second type. Here, the processor 140 may identify the display device 100 as the device to process the control command from the input device if the type of content of the event that occurs in the second region 132 corresponds to the first type. The processor 140 may identify the source device 200 as the device to process the control command from the input device if the type of content of the event that occurs in second region 132 is identified as not corresponding to the first type.

Figure 9:
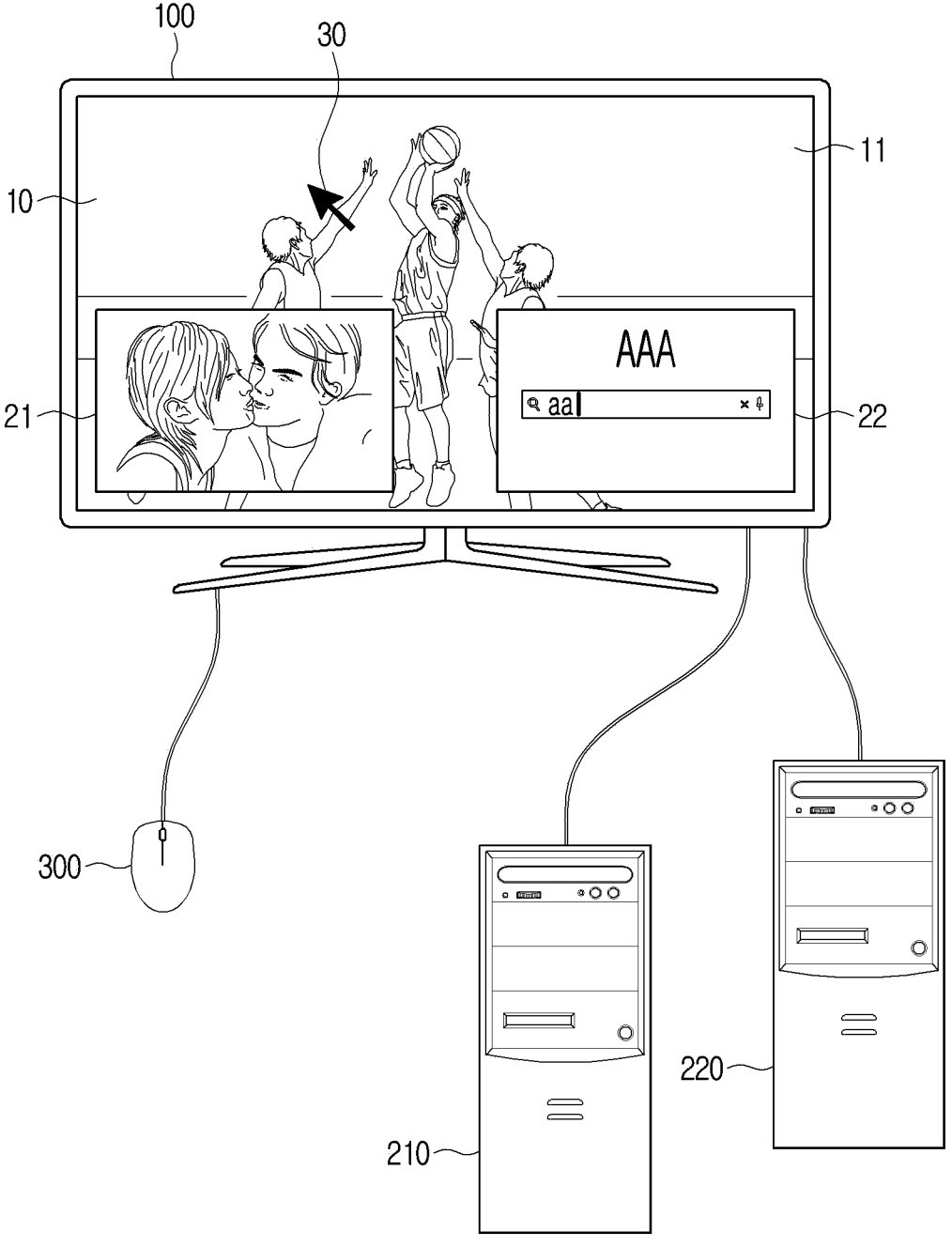
FIG. 9 is a diagram for describing a method for identifying the device to process the control command from the input device among the plurality of source devices and the display device connected to the display device according to an embodiment of the present disclosure.

FIG. 9 is a diagram for describing a method for identifying the device to process the control command from the input device among the plurality of source devices 200 and the display device 100 connected to the display device according to an embodiment.

According to an embodiment, the display device 100 may be connected to the plurality of source devices 200. To this end, the display device 100 may be connected to another source device other than the source device 200 connected via the first interface 110 by using a fourth interface included in the display device 100.

The fourth interface may be implemented in any of various forms such as the HDMI port or the USB port. The fourth interface may also be implemented as the communication interface using the wireless communication. To this end, the fourth interface may include the various communication modules to perform its communication with the external device. As an example, the fourth interface may include the wireless communication module, and include, for example, the cellular communication module using at least one of long-term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM). As another example, the wireless communication module may include, for example, at least one of wireless fidelity (Wi-Fi), Bluetooth, Bluetooth low energy (BLE), or Zigbee.

The processor 140 may control the display 130 to display an image received from another source device in a third region of the display 130, and identify the device to process the control command associated with the indicator 30 among the display device 100, the source device 200, and another source device on the basis of the identified position of the indicator 30.

In detail, the processor 140 may identify the target of the control command from the input device on the basis of the position of the indicator 30. The processor 140 may acquire the state information of each of the display device 100, the source device 200, and another source device on the basis of a type of content provided to each region (in detail, the type of content provided to the first region 131, the type of content provided to the second region 132, and the type of content provided to the third region), and identify the device to process the control command from the input device on the basis of the acquired state information.

Referring to FIG. 9, the processor 140 may display the display device image 10 in the first region 131, display a first source device image 21 in the second region 132, and display a second source device image 22 in the third region that is disposed in the first region 131 and distinguished from the second region 132.

Here, the processor 140 may identify the display device 100 as having the first priority in terms of the priority for the device to process the control command from the input device if the indicator 30 corresponding to the input device is disposed in the first region 131. Here, the processor may determine the second priority and a third priority among a first source device 210 and a second source device 220 based on the type of content provided from each of the first source device 210 and the second source device 220.

The processor 140 may identify the first source device 210 as having the first priority as the device to process the control command from the input device if the indicator 30 corresponding to the input device is disposed in the second region 132. Here, the processor 140 may identify the display device 100 as having the second priority and the second source device 220 as having the third priority.

The processor 140 may identify the second source device 200 as having the first priority in terms of the priority for the device to process the control command from the input device if the indicator 30 corresponding to the input device is disposed in the third region. Here, the processor 140 may identify the display device 100 as having the second priority and the first source device 210 as having the third priority.

The processor 140 may identify the target of the control command from the input device as the display device 100 on the basis of the state information of the display device 100 and state information of the first source device 210 while the indicator 30 corresponding to the input device is disposed in the second region 132. The processor 140 may identify the target of the control command from the input device as the display device 100 on the basis of the state information of the display device 100 or state information of the second source device 220 while the indicator 30 corresponding to the input device is disposed in the third region.

The processor 140 may identify the target of the control command from the input device as the display device 220 on the basis of the state information of the second source device 220 while the indicator 30 corresponding to the input device is disposed in the second region 132. The processor 140 may identify the target of the control command from the input device as the first source device 210 on the basis of the state information of the first source device 210 while the indicator 30 corresponding to the input device is disposed in the third region.

To this end, the display device 100 may set a priority among the plurality of source devices 200 (e.g., first and second source devices 210 and 220). For example, the first source device 210 may be set to have a higher priority than the second source device 220. The processor 140 may identify the target of the control command from the input device as the first source device 210 if the type of content provided to the second region 132, where the first source device image 21 is displayed, is identified as not corresponding to the first type while the indicator 30 corresponding to the input device is disposed in the third region.

Figure 10:
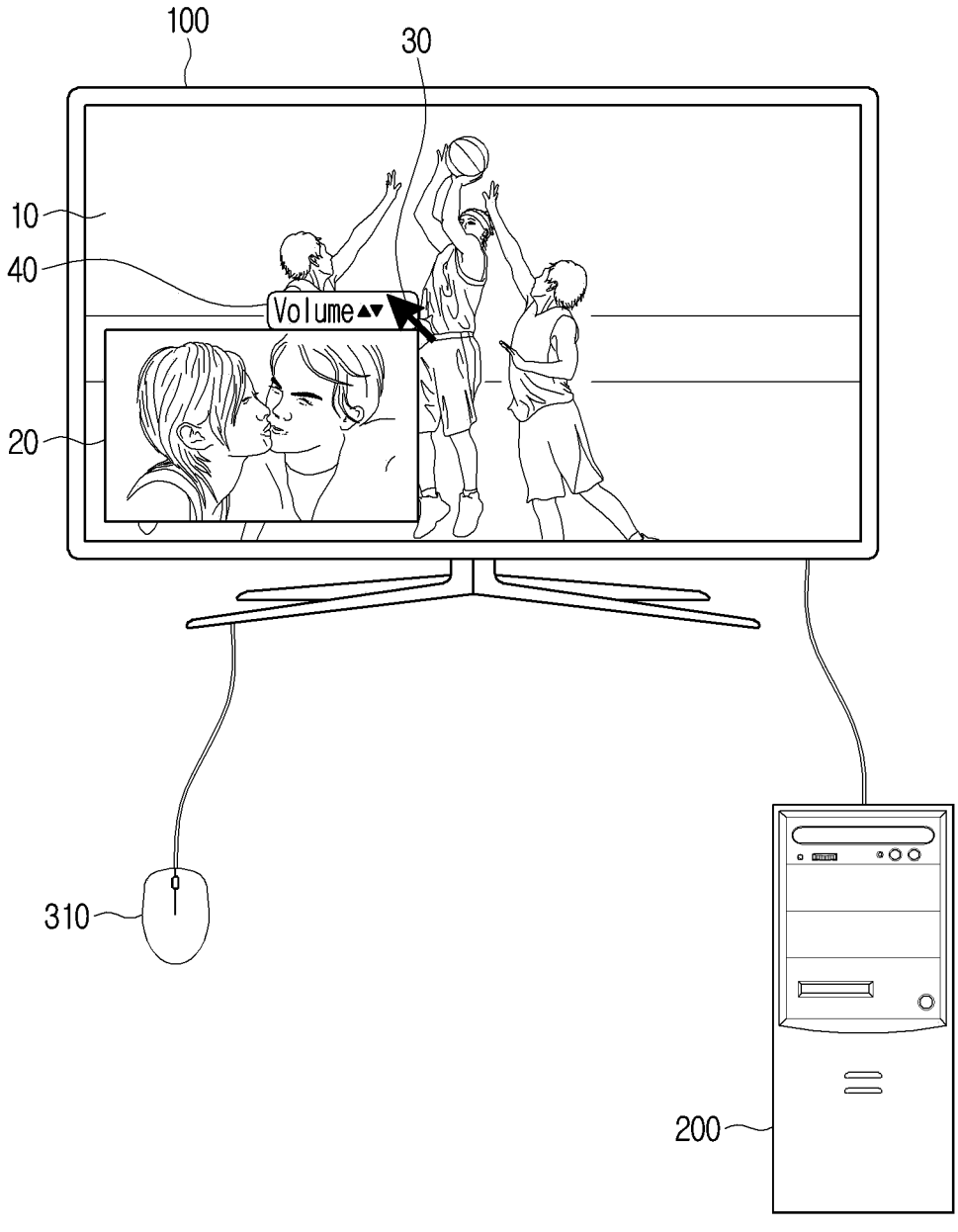
FIG. 10 is an example diagram showing a UI for controlling the source device on the basis of the position of the indicator corresponding to the input device on the display according to an embodiment of the present disclosure.

FIG. 10 is an example diagram showing a UI for controlling the source device 200 on the basis of the position of the indicator 30 corresponding to the input device 300 on the display 130 according to an embodiment.

According to an embodiment, the processor 140 may display a UI for controlling the display device 100 or the source device 200 in a region adjacent to the first region 131 or the second region 132, respectively.

In this regard, according to an embodiment, the display device 100 may further include an output device for outputting audio of the source device image 20. Here, the processor 140 may provide a UI for adjusting a volume of the audio output through the output device in the region adjacent to the second region 132 if the indicator 30 is identified as being disposed in the region adjacent to the second region 132 within the first region 131.

In detail, the processor 140 may output the audio of the source device image 20 displayed in the second region 132 through the output device of the display device 100. To this end, the processor 140 may receive the image data and audio data of the image from the source device 200 through the second interface 120. The processor 140 may synchronize the image data and the audio data received from the source device 200, display the image in the second region 132 on the display 130, and output the audio through the output device. Here, the output device may be implemented as an audio device such as a speaker 190.

The processor 140 may also output audio of the display device image 10 displayed in the first region 131 through the output device. The processor 140 may simultaneously output the audio of the display device image 10 and the audio of the source device image 20 through the output device while the display device image 10 is displayed in the first region 131 and the source device image 20 is displayed in the second region 132. To this end, the output device may be implemented as the plurality of output devices or the plurality of speakers 190. As an example, the processor 140 may output the audio of the display device image 10 through a first output device and the audio of the source device image 20 through a second output device.

The processor 140 may display the UI for controlling the source device 200 in the region adjacent to the second region 132 if the indicator 30 is identified as being disposed in the region adjacent to the second region 132 within the first region 131. The UI displayed here may be a UI for adjusting a volume of the audio of the source device image 20. In detail, the processor 140 may display a UI of the source device that may control the source device 200 if the indicator 30 is identified as being disposed in the region adjacent to the second region 132 within the first region 131 and within a predetermined range from the second region 132. The processor 140 may display the UI of the source device and then identify the second region 132 as extending to a region where the UI of the source device is displayed within the first region 131. The processor 140 may identify that the second region 132, where the existing source device image 20 is displayed, extends to the region where the UI of the source device is displayed. Accordingly, the processor 140 may identify the source device 200 as the device to process the input control command if the control command is input via the input device 300 while the indicator 30 is disposed on the UI of the source device 200.

Referring to FIG. 10, the processor 140 may transmit the input control command to the source device 200 via the second interface 120 if the control command is input via the mouse 310 even if the indicator 30 corresponding to the mouse 310 is present on the UI for adjusting the volume of the source device image 20 displayed in the first region 131.

FIG. 10 shows the UI for adjusting the volume of the source device image 20. The UI displayed in the region adjacent to the second region 132 may have various forms on the basis of the position of the indicator 30, and various control commands may be input in addition to adjusting the volume.

According to an embodiment, the processor 140 may display the indicator 30 by moving the indicator 30 to the first region 131, and identify the display device 100 as the device to process the control command associated with the indicator 30 if the indicator 30 is moved from the second region 132 to the first region 131 based on the control from the input device, and a movement speed of the indicator 30 at a boundary between the second region 132 and the first region 131 is greater than or equal to a threshold speed.

In detail, the processor 140 may identify the movement speed of the indicator 30 disposed in the second region 132. Here, the movement speed of the indicator 30 may be changed based on the control from the input device. The processor 140 may display the indicator 30 by moving the indicator 30 to the first region 131 if the movement speed of the indicator 30 at the boundary between the first and the second region 132 is greater than or equal to the threshold speed in case that the indicator 30 is disposed at the boundary between the first and the second region 132 as the indicator 30 disposed at the second region 132 is moved. Here, the movement speed of the indicator 30 may be a speed corresponding to a direction of a normal vector to the boundary between the first region and the second region 132. The processor 140 may identify the movement speed of the indicator 30 in a vertical direction relative to the boundary between the first region and the second region 132, based on the boundary between the first and the second regions 132, and display the indicator 30 by moving the indicator 30 to the first region 131 if the identified movement speed of the indicator 30 in the vertical direction is greater than or equal to the threshold speed.

According to an embodiment, the processor 140 may display the indicator 30 by moving the indicator 30 to the second region 132, and identify the source device 200 as the device to process the control command associated with the indicator 30 if the indicator 30 is moved from the first region 131 to the second region 132 based on the control from the input device, and the movement speed of the indicator 30 at the boundary between the first region 131 and the second region 132 is greater than or equal to the threshold speed. The description provided above may be applied equally to this configuration.

Figure 11:
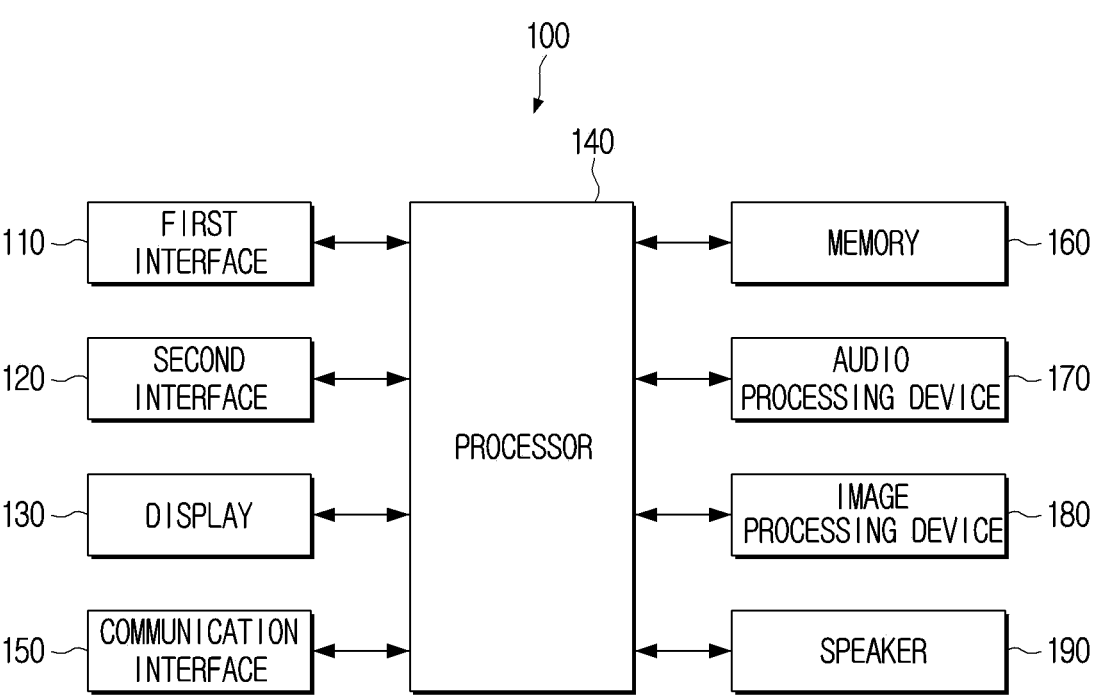
FIG. 11 is a detailed block diagram of the display device according to an embodiment of the present disclosure.

FIG. 11 is a detailed block diagram of the display device 100 according to an embodiment of the present disclosure.

The display device 100 according to an embodiment may include the first interface 110, the second interface 120, the display 130, the communication interface 150, a memory 160, an audio processing device 170, an image processing device 180, the speaker 190, and the processor 140. For additional implementation details, reference may be made to the descriptions of FIG. 2.

The communication interface 150 may perform its communication with various external devices to transmit and receive various types of information. The processor 140 may receive the image from an external electronic device (e.g., OTT service platform server) connected to the display device 100 via the communication interface 150. Here, the received image may be displayed in the first region 131 of the display 130 as the display device image 10.

To this end, the communication interface 150 may include at least one of a short-range wireless communication module or a wireless LAN communication module. The short-range wireless communication module may be a communication module that performs data communication with the external device located in a short distance in a wireless manner, and may be, for example, the Bluetooth module, the Zigbee module, the near field communication (NFC) module, the infrared communication module, or the like. The wireless LAN communication module may be a module that is connected to an external network according to a wireless communication protocol such as Wi-Fi or IEEE to thus communicate with an external server or the external device.

The communication interface 150 may include a mobile communication module. The mobile communication module may include a third generation partnership project (3GPP), a worldwide interoperability for microwave access (Wi-Max), a long term evolution (LTE), a fifth generation (5G), or the like.

The memory 160 may store an operating system (O/S) for driving the display device 100. In addition, the memory 160 may store various software programs or applications for operating the display device 100 according to the various embodiments of the present disclosure. The memory 160 may store various information such as data input, set, or generated during execution of the program or application. In addition, the memory 160 may include various software modules to enable the display device 100 to be operated according to the various embodiments of the present disclosure, and the processor 140 may execute the various software modules stored in the memory 160 to perform the operation of the display device 100 according to the various embodiments of the present disclosure. To this end, the memory 160 may include a semiconductor memory such as a flash memory, or a magnetic storing medium such as a hard disk.

The memory 160 may store the image data corresponding to the display device image 10. In detail, the memory 160 may store the image data or the like acquired by the processor 140 via the communication interface. The processor 140 may acquire the image data stored in the memory 160 and then display the display device image 10 in the first region 131 of the display 130.

The audio processing device 170 may process an audio signal included in the display device image 10 or the image received from the source device 200 into an output signal in a form that may be output through the speaker 190. In detail, the audio processing device 170 may perform tasks of decoding, amplifying, or noise filtering on the audio signal included in the image, thus processing the audio signal included in the image into the output signal in the form that may be output through the speaker 190. The audio processing device 170 may separate the audio of the display device image 10 and the audio of the source device image 20 and output the same through the speaker 190, respectively, if the display device image 10 and the source device image 20 are simultaneously displayed on the display 130.

The image processing device 180 is a component for processing the image data acquired by the processor 140. The image processing device 180 may perform various image processing such as decoding, scaling, noise filtering, frame rate conversion, and resolution conversion on the image data. The image processing device 180 may include a plurality of video processing modules to process the plurality of images (e.g., display device image 10 and source device image 20).

The speaker 190 may output the audio of the display device image 10 and the audio of the source device image 20. In detail, the speaker 190 may output various audio, various notification sounds, or voice messages, for which various processing tasks such as decoding, amplification, and noise filtering are performed by the audio processing device 170.

Although not clearly shown in the drawing, the display device 100 may further include a microphone. The microphone may receive an audio signal surrounding the display device 100. As an example, the microphone may receive a user voice to control the display device 100. If the user voice is received through the microphone to execute a function, the processor 140 may convert the user voice into a digital signal by using a speech to text (STT) algorithm and provide response information corresponding to the user voice.

Figure 12:
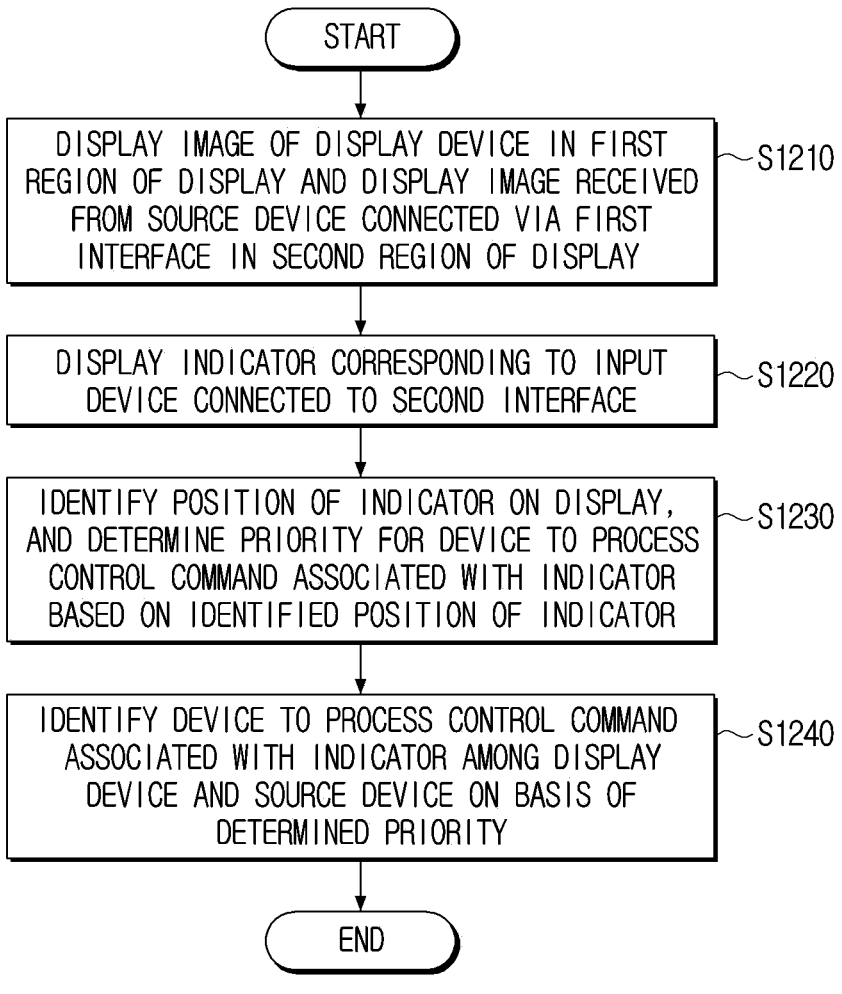
FIG. 12 is a flowchart showing a control method for a display device according to an embodiment of the present disclosure.

FIG. 12 is a flowchart schematically showing a control method for a display device 100 according to an embodiment of the present disclosure.

Figure 13:
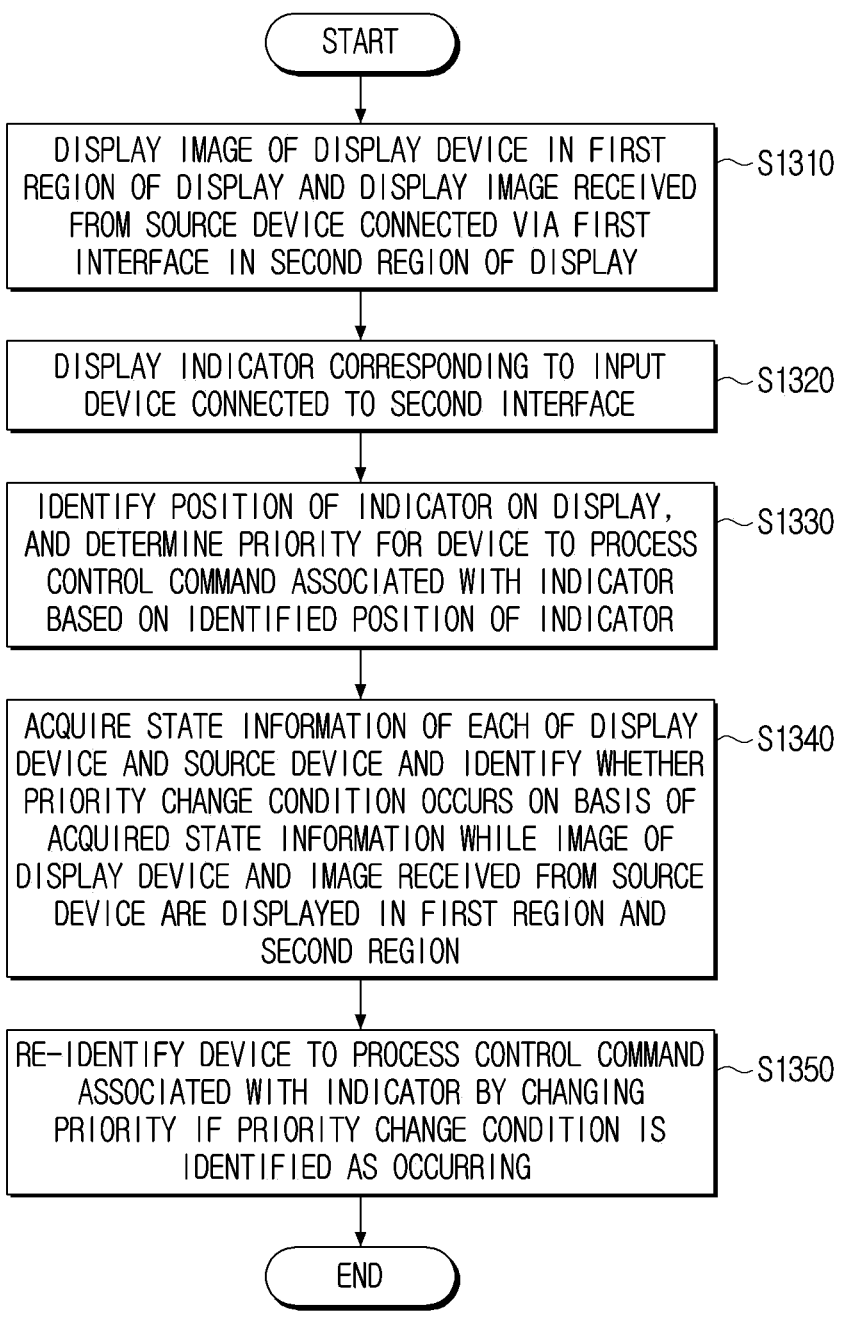
FIG. 13 is a flowchart showing the control method for a display device according to an embodiment of the present disclosure.

FIG. 13 is a flowchart schematically showing the control method for a display device 100 according to an embodiment of the present disclosure.

Referring to FIG. 12, in controlling the display device 100, the processor 140 may display the image of the display device 100 in the first region 131 of the display 130 included in the display device 100 and display the image received from the source device 200 connected via the first interface 110 of the display device 100 in the second region 132 of the display 130 (S1210).

The processor 140 may display the indicator 30 corresponding to the input device 300 connected to the second interface 120 of the display device 100 on the display 130 (S1220).

The processor 140 may identify the position of the indicator 30 displayed on the display 130, and determine the priority for the device to process the control command associated with the indicator 30 on the basis of the identified position of the indicator 30 (S1230).

The processor 140 may identify the device to process the control command associated with the indicator 30 between the display device 100 and the source device 200 on the basis of the determined priority (S1240). The processor 140 may identify the device to process the control command, then continuously identify whether the factor that may change the determined priority (for example, priority change condition) occurs, and re-identify the device to process the control command associated with the indicator 30 by changing the priority.

Here, the processor 140 may identify the display device 100 as the device to process the control command associated with the indicator 30, and process the control command associated with the indicator 30 if the identified position of the indicator 30 is identified as being included in the first region 131. The processor 140 may identify the display device 100 as having the first priority and the source device 200 as having the second priority in terms of the priority for the device to process the control command if the position of the indicator 30 is identified as being included in the first region 131.

The processor 140 may identify the source device 200 as the device to process the control command associated with the indicator 30 and transmit the control command associated with the indicator 30 to the source device 200 via the second interface 120 if the identified position of the indicator 30 is identified as being included in the second region 132. The processor 140 may identify the source device 200 as having the first priority and the display device 100 as having the second priority in terms of the priority for the device to process the control command if the position of the indicator 30 is identified as being included in the second region 132.

Here, according to an embodiment, the processor 140 may display the UI for adjusting the volume of the audio output through the output device of the display device 100 in the region adjacent to the second region 132 if the indicator 30 is identified as being disposed in the region adjacent to the second region 132 within the first region 131.

The display device 100 may be further connected to another source device other than the source device 200. In detail, the display device 100 may be connected to another source device via the fourth interface. Here, the processor 140 may display the image received from another source device connected to the fourth interface of the display device 100 in the third region of the display 130. At step S1330, the processor 140 may identify the priority for the device to process the control command associated with the indicator 30 on the basis of the identified position of the indicator 30, and identify the device to process the control command associated with the indicator 30 among the display device 100, the source device 200, and another source device on the basis of the priority identified at step S1340.

Steps S1310 to S1330 shown in FIG. 13 may correspond to steps S1210 to S1230 shown in FIG. 12, respectively. For additional implementation details, reference may be made to the descriptions of FIG. 12.

Referring to FIG. 13, the processor 140 may acquire the state information of each of the display device 100 and the source device 200 and identify whether the priority change condition occurs on the basis of the acquired state information while the image of the display device 100 and the image received from the source device 200 are displayed in the first region 131 and the second region 132 (S1340).

The processor 140 may re-identify the device to process the control command associated with the indicator 30 by changing the priority if the priority change condition is identified as occurring (S1350).

At step S1340, the processor 140 may identify the type of content provided to the second region 132 based on the state information of the source device 200 while the indicator 30 is included in the second region 132, and identify that the priority change condition occurs if the identified type of content is identified as the first type of content.

Here, at step S1350, the processor 140 re-identify the device to process the control command associated with the indicator 30 as the display device 100 by changing the determined priority.

According to an embodiment, at step S1340, the processor 140 may identify the type of content provided to the first region 131 based on the state information of the display device 100 while the indicator 30 is included in the second region 132, and identify that the priority change condition occurs if the identified type of content is identified as the second type of content. Here, the second type of content may include the controllable pop-up UI. At step S1350, the processor 140 may re-identify the device to process the control command associated with the indicator 30 as the display device 100 by changing the priority. Here, at step S1350, the processor 140 may re-identify the device to process the control command associated with the indicator 30 as the display device 100 by changing the determined priority.

According to an embodiment, the display device 100 may also be connected to another input device connected via the third interface. The processor 140 may display the indicator 30 corresponding to another input device connected via the third interface on the display 130. Here, at step S1350, the processor 140 may identify the display device 100 as the device to process the control command associated with the indicator 30 corresponding to the input device 300, and identify the source device 200 as the device to process the control command associated with the indicator 30 corresponding to another input device if the content provided to the first region 131 is the controllable pop-up UI while the indicator 30 corresponding to the input device 300 and the indicator 30 corresponding to another input device connected via the third interface of the display device 100 are included in the second region 132. The processor 140 may re-identify the target of the control command associated with the indicator 30 corresponding to the input device 300 by only changing the priority for the target of the control command associated with the indicator 30 corresponding to the input device 300.

The processor 140 may display the indicator 30 at the position of the indicator 30 in the second region 132 before the pop-up UI is displayed if the pop-up UI disappears from the first region 131 based on the control command associated with the indicator 30.

The methods according to the various embodiments described above may be implemented in the form of an application which may be installed on a display device. The methods according to the various embodiments described above may be performed using a deep learning-based trained neural network (or deep trained neural network), a learning network model. The methods according to the various embodiments described above may be implemented only by software upgrade or hardware upgrade of the display device. The various embodiments described above may be performed through an embedded server included in the display device, or the external server of the display device.

According to an embodiment, the various embodiments described above may be implemented in software including an instruction stored on a machine-readable storage medium (for example, a computer-readable storage medium). A machine may be a device that invokes the stored instruction from the storage medium, may be operated based on the invoked instruction, and may include the display device (e.g., display device A) according to the disclosed embodiments. If the instruction is executed by the processor, the processor may directly perform a function corresponding to the instruction or other components may perform the function corresponding to the instruction under control of the processor. The instruction may include codes generated or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored on the storage medium.

According to an embodiment, the methods according to the various embodiments described above may be included and provided in a computer program product. The computer program product may be traded as a commodity between a seller and a purchaser. The computer program product may be distributed in a form of the machine-readable storage medium (for example, a compact disc read only memory (CD-ROM)), or may be distributed online through an application store (for example, PlayStore™. In case of the online distribution, at least a part of the computer program product may be at least temporarily stored or temporarily generated on a storage medium such as the memory of a manufacturer server, an application store server, or a relay server.

Each of the components (for example, modules or programs) according to the various embodiments described above may include a single entity or a plurality of entities, and other sub-components may be further included in the various embodiments. Some of the components (for example, the modules or the programs) may be integrated into the single entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order, or other operations may be added.

Although the embodiments are shown and described in the present disclosure the present disclosure is not limited to the above-described embodiments, and may be variously modified by those skilled in the art to which the present disclosure pertains without departing from the scope and spirit of the present disclosure. These modifications should also be understood to fall within the scope and spirit of the present disclosure.

What is claimed is:

1. A display device comprising:
a first interface connected to an input device;
a second interface connected to a source device;
a display;
at least one processor; and
memory storing instructions,
wherein the instructions, when executed by the at least one processor, cause the display device to:
control the display to display a first image of the display device in a first region of the display, and display a second image in a second region of the display, wherein the second image is received from the source device via the second interface;
determine a priority for processing a control command associated with an indicator corresponding to the input device based on a position of the indicator on the display, and
identify a device from among the display device and the source device to process the control command based on the priority,
based on the first image being displayed in the first region and the second image being displayed in the second region, acquire first state information from the display device and second state information from the source device, and identify whether a priority change condition has occurred based on the first state information and the second state information, and
based on identifying the priority change condition has occurred, re-identify the device to process the control command by changing the priority.

2. The display device as claimed in claim 1, wherein the instructions, when executed by the at least one processor, cause the display device to:
identify the display device as the device to process the control command, and process the control command based on identifying the position of the indicator corresponds to the first region, and
identify the source device as the device to process the control command, and transmit the control command to the source device, via the second interface, based on identifying the position of the indicator corresponds to the second region.

3. The display device as claimed in claim 2, wherein the instructions, when executed by the at least one processor, cause the display device to:
identify, based on the position of the indicator corresponding to the second region, a type of content output to the second region, based on the second state information;
identify that the priority change condition has occurred based on identifying the type of content as a first type; and
re-identify the display device as the device to process the control command by changing the priority.

4. The display device as claimed in claim 1, wherein the instructions, when executed by the at least one processor, cause the display device to:
identify, based on the position of the indicator corresponding to the second region, a type of content output to the first region, based on the first state information,
identify, based on the type of content being a second type, that the priority change condition has occurred, and change the priority, wherein the second type comprises a controllable pop-up user interface (UI); and
re-identify the display device as the device to process the control command.

5. The display device as claimed in claim 4, wherein the instructions, when executed by the at least one processor, cause the display device to, based on a first pop-up UI being displayed in the first region and the control command causing the first pop-up UI to disappear, return the position of the indicator to a prior position of the indicator in the second region from before the first pop-up UI was displayed.

6. The display device as claimed in claim 4, wherein the first interface is connected to a first input device,
wherein the display device further comprises a third interface connected to second input device, and
wherein the instructions, when executed by the at least one processor, cause the display device to:
associate a first indicator with the first input device, and associate a second indicator with the second input device; and
based on a first controllable pop-up UI being displayed in the first region, a first position of the first indicator corresponding to the second region, and a second position of the second indicator corresponding to the second region, identify the display device to process a first control command associated with the first indicator, and the source device process a second control command associated with the second indicator.

7. The display device as claimed in claim 1, further comprising a speaker configured to output audio from the source device,
wherein the instructions, when executed by the at least one processor, cause the display device to control the display to display a UI for adjusting a volume of the audio in a third region of the display based on the position of the indicator corresponding to the third region, wherein the third region is within the first region and is adjacent to the second region.

8. The display device as claimed in claim 1, wherein the second interface is connected to a first source device,
wherein the display device further comprises a third interface connected to a second source device, and
wherein the instructions, when executed by the at least one processor, cause the display device to:

control the display to display, in a third region, a third image received from the second source device;

identify the device to process the control command from among the display device, the first source device, and the second source device based on the priority.

9. A control method of a display device including a first interface and a second interface, the control method comprising:

displaying a first image of the display device in a first region of a display of the display device, and displaying a second image in a second region of the display, wherein the second image is received from a source device connected to the display device via the second interface of the display device;

determining a priority for processing a control command associated with an indicator corresponding to an input device connected to the display device via the first interface based on a position of the indicator on the display; and identifying a device from among the display device and the source device to process the control command based on the priority;

based on the first image of the display device being displayed in the first region and the second image being displayed in the second region, acquiring first state information from the display device and second state information from the source device, and identifying whether a priority change condition has occurred based on the first state information and the second state information; and based on identifying the priority change condition has occurred, re-identifying the device to process the control command by changing the priority.

10. The control method as claimed in claim 9, wherein the identifying the device to process the control command comprises:

identifying the display device as the device to process the control command, and processing the control command based on identifying the position of the indicator corresponds to the first region; and identifying the source device as the device to process the control command, and transmitting the control command to the source device, via the second interface, based on identifying the position of the indicator corresponds to the second region.

11. The control method as claimed in claim 9, wherein the re-identifying the device to process the control command comprises:

identifying, based on the position of the indicator corresponding to the second region, a type of content output to the second region, based on the second state information;

identifying the priority change condition has occurred based on identifying the type of content as a first type; and re-identifying the device to process the control command by changing the priority.

12. The control method as claimed in claim 9, wherein the re-identifying the device to process the control command comprises:

identifying, based on the position of the indicator corresponding to the second region, a type of content output to the first region, based on the first state information;

identifying, based on the type of content being a second type, that the priority change condition has occurred, and change the priority, wherein the second type comprises a controllable pop-up user interface (UI); and re-identifying the display device as the device to process the control command.

13. The control method as claimed in claim 12, further comprising, based on a first pop-up UI being displayed in the first region and the control command causing the first pop-up UI to disappear, returning the position of the indicator to a prior position of the indicator in the second region from before the first pop-up UI was displayed.

14. The control method as claimed in claim 12, wherein a first input device is connected to the display device via the first interface, and a second input device is connected to the display device via a third interface of the display device, wherein the control method further comprises associating a first indicator with the first input device, and associating a second indicator with the second input device, and wherein the re-identifying the device to process the control command comprises, based on a first controllable pop-up UI being displayed in the first region, a first position of the first indicator corresponding to the second region, and a second position of the second indicator corresponding to the second region, processing, with the display device, a first control command associated with the first indicator, and processing, with the source device, a second control command associated with the second indicator.

15. The control method as claimed in claim 9, further comprising:

displaying a UI for adjusting a volume of the audio in a third region of the display based on the position of the indicator corresponding to the third region, wherein the third region is within the first region and is adjacent to the second region.

16. The control method as claimed in claim 9, wherein the display device further comprises a third interface connected to a second source device, and wherein the control method further comprising:

displaying, in a third region, a third image received from the second source device;

identifying the device to process the control command from among the display device, the first source device, and the second source device based on the priority.

17. A non-transitory computer-readable recording medium having instructions recorded thereon, that, when executed by one or more processors, cause the one or more processors to:

display a first image of the display device in a first region of a display of a display device, and display a second image in a second region of the display, wherein the second image is received from a source device connected to the display device via a second interface of the display device;

determining a priority for processing a control command associated with an indicator corresponding to an input device connected to the display device via a first interface of the display device based on a position of the indicator on the display;

identify a device from among the display device and the source device to process the control command based on the priority;

based on the first image of the display device being displayed in the first region and the second image being displayed in the second region, acquire first state information from the display device and second state information from the source device, and identify whether a priority change condition has occurred based on the first state information and the second state information; and based on identifying the priority change condition has occurred, re-identify the device to process the control command by changing the priority.

18. The non-transitory computer-readable recording medium as claimed in claim 17, wherein the identifying the device to process the control command comprises:

identifying the display device as the device to process the control command, and processing the control command based on identifying the position of the indicator corresponds to the first region; and identifying the source device as the device to process the control command, and transmitting the control command to the source device, via the second interface, based on identifying the position of the indicator corresponds to the second region.

19. The non-transitory computer-readable recording medium as claimed in claim 17, wherein the re-identifying the device to process the control command comprises:

identifying, based on the position of the indicator corresponding to the second region, a type of content output to the second region, based on the second state information;

identifying the priority change condition has occurred based on identifying the type of content as a first type; and re-identifying the device to process the control command by changing the priority.

20. The non-transitory computer-readable recording medium as claimed in claim 17, wherein the re-identifying the device to process the control command comprises:

identifying, based on the position of the indicator corresponding to the second region, a type of content output to the first region, based on the first state information;

identifying, based on the type of content being a second type, that the priority change condition has occurred, and change the priority, wherein the second type comprises a controllable pop-up user interface (UI); and re-identifying the display device as the device to process the control command.

* * * * *